United States Patent
Govande et al.

(10) Patent No.: US 11,651,398 B2
(45) Date of Patent: May 16, 2023

(54) CONTEXTUAL MENUS BASED ON IMAGE RECOGNITION

(71) Applicant: eBay Inc., San Jose, CA (US)

(72) Inventors: Shailesh Dinkar Govande, Round Rock, TX (US); Madhura Pravin Tipnis, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/039,443

(22) Filed: Sep. 30, 2020

(65) Prior Publication Data

US 2021/0027345 A1 Jan. 28, 2021

Related U.S. Application Data

(63) Continuation of application No. 13/537,482, filed on Jun. 29, 2012, now Pat. No. 10,846,766.

(51) Int. Cl.
*G06F 16/583* (2019.01)
*G06Q 30/06* (2023.01)
*G06F 3/0482* (2013.01)
*G06Q 30/02* (2023.01)

(52) U.S. Cl.
CPC .......... *G06Q 30/06* (2013.01); *G06F 3/0482* (2013.01); *G06F 16/583* (2019.01); *G06Q 30/02* (2013.01)

(58) Field of Classification Search
CPC ...... G06Q 30/06; G06Q 30/02; G06F 16/583; G06F 3/0482
See application file for complete search history.

(56) References Cited

U.S. PATENT DOCUMENTS

| 3,675,215 A | 7/1972 | Arnold et al. |
| 4,539,585 A | 9/1985 | Spackova et al. |
| 4,596,144 A | 6/1986 | Panton et al. |
| 4,753,079 A | 6/1988 | Sumitomo |
| 5,068,723 A | 11/1991 | Dixit et al. |
| 5,408,417 A | 4/1995 | Wilder |
| 5,546,475 A | 8/1996 | Bolle et al. |

(Continued)

FOREIGN PATENT DOCUMENTS

| AU | 2012212601 A1 | 10/2013 |
| AU | 2015264850 A1 | 12/2015 |

(Continued)

OTHER PUBLICATIONS

Response to Non-Final Office Action filed on Jun. 12, 2015, for U.S. Appl. No. 12/371,882, dated Mar. 12, 2015, 18 pages.

(Continued)

*Primary Examiner* — Beau D Spratt
(74) *Attorney, Agent, or Firm* — Holland & Hart LLP

(57) ABSTRACT

Contextual menus based on images submitted to a network based publication system are disclosed. Images depicting a variety of locales such as businesses, or other items, may be stored in an image repository in the system and used to identify images that users may submit as photograph images taken by cell phone, camera, webcam, a laptop with camera capability. After identification of the submitted image the system may categorize the image and provide the user a category driven menu relating to the photograph, the menu based on both the submitted image and the user's intent when he or she is capturing the image.

21 Claims, 9 Drawing Sheets

(56) References Cited

U.S. PATENT DOCUMENTS

| | | |
|---|---|---|
| 5,579,471 A | 11/1996 | Barber et al. |
| 5,633,678 A | 5/1997 | Parulski et al. |
| 5,692,012 A | 11/1997 | Virtamo et al. |
| 5,724,660 A | 3/1998 | Kauser et al. |
| 5,727,379 A | 3/1998 | Cohn |
| 5,732,354 A | 3/1998 | MacDonald |
| 5,781,899 A | 7/1998 | Hirata |
| 5,802,361 A | 9/1998 | Wang et al. |
| 5,818,964 A | 10/1998 | Itoh |
| 5,848,373 A | 12/1998 | DeLorme et al. |
| 5,870,149 A | 2/1999 | Comroe et al. |
| 5,889,896 A | 3/1999 | Meshinsky et al. |
| 5,890,068 A | 3/1999 | Fattouche et al. |
| 5,949,429 A | 9/1999 | Bonneau et al. |
| 6,069,570 A | 5/2000 | Herring |
| 6,091,956 A | 7/2000 | Hollenberg |
| 6,097,958 A | 8/2000 | Bergen |
| 6,112,226 A | 8/2000 | Weaver et al. |
| 6,134,548 A | 10/2000 | Gottsman et al. |
| 6,134,674 A | 10/2000 | Akasheh |
| 6,151,587 A | 11/2000 | Matthias |
| 6,154,738 A | 11/2000 | Call |
| 6,157,435 A | 12/2000 | Slater et al. |
| 6,157,841 A | 12/2000 | Bolduc et al. |
| 6,167,274 A | 12/2000 | Smith |
| 6,198,927 B1 | 3/2001 | Wright et al. |
| 6,204,812 B1 | 3/2001 | Fattouche |
| 6,208,297 B1 | 3/2001 | Fattouche et al. |
| 6,208,857 B1 | 3/2001 | Agre et al. |
| 6,216,134 B1 | 4/2001 | Heckerman et al. |
| 6,216,227 B1 | 4/2001 | Goldstein et al. |
| 6,243,588 B1 | 6/2001 | Koorapaty et al. |
| 6,246,861 B1 | 6/2001 | Messier et al. |
| 6,246,882 B1 | 6/2001 | Lachance |
| 6,259,381 B1 | 7/2001 | Small |
| 6,259,923 B1 | 7/2001 | Lim et al. |
| 6,266,014 B1 | 7/2001 | Fattouche et al. |
| 6,278,446 B1 | 8/2001 | Liou et al. |
| 6,292,593 B1 | 9/2001 | Nako et al. |
| 6,314,365 B1 | 11/2001 | Smith |
| 6,317,684 B1 | 11/2001 | Roeseler et al. |
| 6,330,452 B1 | 12/2001 | Fattouche et al. |
| 6,341,255 B1 | 1/2002 | Lapidot |
| 6,347,230 B2 | 2/2002 | Koshima et al. |
| 6,356,543 B2 | 3/2002 | Hall et al. |
| 6,404,388 B1 | 6/2002 | Sollenberger et al. |
| 6,424,840 B1 | 7/2002 | Fitch et al. |
| 6,434,530 B1 | 8/2002 | Sloane et al. |
| 6,456,852 B2 | 9/2002 | Bar et al. |
| 6,463,426 B1 | 10/2002 | Lipson et al. |
| 6,477,269 B1 | 11/2002 | Brechner |
| 6,477,363 B1 | 11/2002 | Ayoub et al. |
| 6,483,570 B1 | 11/2002 | Slater et al. |
| 6,484,130 B2 | 11/2002 | Dwyer et al. |
| 6,512,919 B2 | 1/2003 | Ogasawara |
| 6,519,463 B2 | 2/2003 | Tendler |
| 6,530,521 B1 | 3/2003 | Henry |
| 6,549,913 B1 | 4/2003 | Murakawa |
| 6,563,459 B2 | 5/2003 | Takenaga |
| 6,563,959 B1 | 5/2003 | Troyanker |
| 6,567,797 B1 | 5/2003 | Schuetze et al. |
| 6,577,946 B2 | 6/2003 | Myr |
| 6,580,914 B1 | 6/2003 | Smith |
| 6,587,835 B1 | 7/2003 | Treyz et al. |
| 6,589,290 B1 | 7/2003 | Maxwell et al. |
| 6,590,533 B2 | 7/2003 | Sollenberger et al. |
| 6,618,593 B1 | 9/2003 | Drutman et al. |
| 6,625,457 B1 | 9/2003 | Raith |
| 6,642,929 B1 | 11/2003 | Essafi et al. |
| 6,690,322 B2 | 2/2004 | Shamoto et al. |
| 6,714,797 B1 | 3/2004 | Rautila |
| 6,714,945 B1 | 3/2004 | Foote et al. |
| 6,724,930 B1 | 4/2004 | Kosaka et al. |
| 6,732,080 B1 | 5/2004 | Blants |
| 6,763,148 B1 | 7/2004 | Sternberg et al. |
| 6,783,148 B2 | 8/2004 | Henderson |
| 6,804,662 B1 | 10/2004 | Annau et al. |
| 6,807,479 B2 | 10/2004 | Watanabe et al. |
| 6,901,379 B1 | 5/2005 | Balter et al. |
| 6,947,571 B1 | 9/2005 | Rhoads et al. |
| 7,022,281 B1 | 4/2006 | Senff |
| 7,023,441 B2 | 4/2006 | Choi et al. |
| 7,062,722 B1 | 6/2006 | Carlin et al. |
| 7,082,365 B2 | 7/2006 | Sheha et al. |
| 7,092,702 B2 | 8/2006 | Cronin et al. |
| 7,130,466 B2 | 10/2006 | Seeber |
| 7,130,622 B2 | 10/2006 | Vaenskae et al. |
| 7,138,913 B2 | 11/2006 | Mackenzie et al. |
| 7,142,858 B2 | 11/2006 | Aoki et al. |
| 7,149,665 B2 | 12/2006 | Feld et al. |
| 7,162,082 B2 | 1/2007 | Edwards |
| 7,199,815 B2 | 4/2007 | Aoyama |
| 7,240,025 B2 | 7/2007 | Stone et al. |
| 7,254,388 B2 | 8/2007 | Nam et al. |
| 7,254,779 B1 | 8/2007 | Rezvani et al. |
| 7,257,268 B2 | 8/2007 | Eichhorn et al. |
| 7,273,172 B2 | 9/2007 | Olsen, III et al. |
| 7,281,018 B1 | 10/2007 | Begun et al. |
| 7,346,453 B2 | 3/2008 | Matsuoka |
| 7,346,543 B1 | 3/2008 | Edmark |
| 7,363,214 B2 | 4/2008 | Musgrove et al. |
| 7,363,252 B2 | 4/2008 | Fujimoto |
| 7,460,735 B1 | 12/2008 | Rowley et al. |
| 7,478,143 B1 | 1/2009 | Friedman et al. |
| 7,495,674 B2 | 2/2009 | Biagiotti et al. |
| 7,502,133 B2 | 3/2009 | Fukunaga et al. |
| 7,519,562 B1 | 4/2009 | Vander et al. |
| 7,568,004 B2 | 7/2009 | Gottfried |
| 7,587,359 B2 | 9/2009 | Levy et al. |
| 7,593,602 B2 | 9/2009 | Stentiford |
| 7,669,759 B1 | 3/2010 | Zettner |
| 7,683,858 B2 | 3/2010 | Allen et al. |
| 7,702,185 B2 | 4/2010 | Keating et al. |
| 7,747,259 B2 | 6/2010 | Pande et al. |
| 7,752,082 B2 | 7/2010 | Calabria |
| 7,756,757 B1 | 7/2010 | Oakes, III |
| 7,761,339 B2 | 7/2010 | Alivandi |
| 7,801,893 B2 | 9/2010 | Gulli et al. |
| 7,827,074 B1 | 11/2010 | Rolf |
| 7,848,764 B2 | 12/2010 | Riise et al. |
| 7,881,560 B2 | 2/2011 | John |
| 7,890,386 B1 | 2/2011 | Reber |
| 7,916,129 B2 | 3/2011 | Lin et al. |
| 7,921,040 B2 | 4/2011 | Reber |
| 7,933,811 B2 | 4/2011 | Reber |
| 7,957,510 B2 | 6/2011 | Denney et al. |
| 7,996,282 B1 | 8/2011 | Scott et al. |
| 8,078,498 B2 | 12/2011 | Edmark |
| 8,098,894 B2 | 1/2012 | Soderstrom |
| 8,130,242 B2 | 3/2012 | Cohen |
| 8,131,118 B1* | 3/2012 | Jing .................. G06V 20/20 |
| | | 701/426 |
| 8,230,016 B1 | 7/2012 | Pattan et al. |
| 8,233,723 B2 | 7/2012 | Sundaresan |
| 8,239,130 B1 | 8/2012 | Upstill et al. |
| 8,260,846 B2 | 9/2012 | Lahav |
| 8,275,590 B2 | 9/2012 | Szymczyk et al. |
| 8,370,062 B2 | 2/2013 | Starenky et al. |
| 8,385,646 B2 | 2/2013 | Lang et al. |
| 8,411,977 B1 | 4/2013 | Baluja et al. |
| 8,421,872 B2 | 4/2013 | Neven, Sr. |
| 8,442,871 B2 | 5/2013 | Veres et al. |
| 8,650,072 B2 | 2/2014 | Mason et al. |
| 8,811,957 B2 | 8/2014 | Jovicic et al. |
| 9,037,600 B1* | 5/2015 | Garrigues ............ G06F 16/50 |
| | | 707/769 |
| 9,058,764 B1 | 6/2015 | Persson et al. |
| 9,251,395 B1* | 2/2016 | Botchen ............ G06Q 30/02 |
| 9,495,386 B2 | 11/2016 | Tapley et al. |
| 10,846,766 B2 | 11/2020 | Govande et al. |
| 10,956,775 B2 | 3/2021 | Tapley et al. |
| 2001/0034668 A1 | 10/2001 | Whitworth |
| 2001/0049636 A1 | 12/2001 | Hudda et al. |
| 2001/0055976 A1 | 12/2001 | Crouch et al. |

(56) References Cited

U.S. PATENT DOCUMENTS

| | | |
|---|---|---|
| 2002/0002504 A1 | 1/2002 | Engel et al. |
| 2002/0027694 A1 | 3/2002 | Kim et al. |
| 2002/0052709 A1 | 5/2002 | Akatsuka et al. |
| 2002/0072993 A1 | 6/2002 | Sandus et al. |
| 2002/0094189 A1 | 7/2002 | Navab et al. |
| 2002/0102967 A1 | 8/2002 | Chang et al. |
| 2002/0107737 A1 | 8/2002 | Kaneko et al. |
| 2002/0116286 A1 | 8/2002 | Walker et al. |
| 2002/0143930 A1 | 10/2002 | Babu et al. |
| 2002/0145984 A1 | 10/2002 | Babu et al. |
| 2002/0146176 A1 | 10/2002 | Meyers |
| 2002/0155844 A1 | 10/2002 | Rankin et al. |
| 2002/0196333 A1 | 12/2002 | Gorischek |
| 2003/0004802 A1 | 1/2003 | Callegari |
| 2003/0018652 A1 | 1/2003 | Heckerman et al. |
| 2003/0028873 A1 | 2/2003 | Lemmons |
| 2003/0051255 A1 | 3/2003 | Bulman et al. |
| 2003/0053706 A1 | 3/2003 | Hong et al. |
| 2003/0063128 A1 | 4/2003 | Salmimaa et al. |
| 2003/0065805 A1 | 4/2003 | Barnes |
| 2003/0080978 A1 | 5/2003 | Navab et al. |
| 2003/0085894 A1 | 5/2003 | Tatsumi |
| 2003/0098892 A1 | 5/2003 | Hiipakka |
| 2003/0101105 A1 | 5/2003 | Vock |
| 2003/0112260 A1 | 6/2003 | Gouzu |
| 2003/0123026 A1 | 7/2003 | Abitbol et al. |
| 2003/0125043 A1 | 7/2003 | Silvester |
| 2003/0126150 A1 | 7/2003 | Chan |
| 2003/0130787 A1 | 7/2003 | Clapper |
| 2003/0130910 A1 | 7/2003 | Pickover et al. |
| 2003/0134645 A1 | 7/2003 | Stern et al. |
| 2003/0139190 A1 | 7/2003 | Steelberg et al. |
| 2003/0147623 A1 | 8/2003 | Fletcher |
| 2003/0195044 A1 | 10/2003 | Narita |
| 2003/0197740 A1 | 10/2003 | Reponen |
| 2003/0208409 A1 | 11/2003 | Mault |
| 2003/0216960 A1 | 11/2003 | Postrel |
| 2003/0220835 A1 | 11/2003 | Barnes |
| 2003/0229537 A1 | 12/2003 | Dunning et al. |
| 2003/0231806 A1 | 12/2003 | Troyanker |
| 2004/0002359 A1 | 1/2004 | Deas et al. |
| 2004/0019643 A1 | 1/2004 | Zirnstein, Jr. |
| 2004/0021567 A1 | 2/2004 | Dunn |
| 2004/0043773 A1 | 3/2004 | Lee et al. |
| 2004/0046779 A1 | 3/2004 | Asano et al. |
| 2004/0057627 A1 | 3/2004 | Abe et al. |
| 2004/0075670 A1 | 4/2004 | Bezine et al. |
| 2004/0096096 A1 | 5/2004 | Huber |
| 2004/0128320 A1 | 7/2004 | Grove et al. |
| 2004/0133927 A1 | 7/2004 | Sternberg et al. |
| 2004/0144338 A1 | 7/2004 | Goldman |
| 2004/0153505 A1 | 8/2004 | Verdi et al. |
| 2004/0192339 A1 | 9/2004 | Wilson et al. |
| 2004/0192349 A1 | 9/2004 | Reilly |
| 2004/0203901 A1 | 10/2004 | Wilson et al. |
| 2004/0203931 A1 | 10/2004 | Karaoguz |
| 2004/0205286 A1 | 10/2004 | Bryant et al. |
| 2004/0220767 A1 | 11/2004 | Tanaka et al. |
| 2004/0220821 A1 | 11/2004 | Ericsson et al. |
| 2004/0230558 A1 | 11/2004 | Tokunaka |
| 2005/0001852 A1 | 1/2005 | Dengler et al. |
| 2005/0004850 A1 | 1/2005 | Gutbrod et al. |
| 2005/0010486 A1 | 1/2005 | Pandhe |
| 2005/0015300 A1 | 1/2005 | Smith et al. |
| 2005/0065655 A1 | 3/2005 | Hong et al. |
| 2005/0081161 A1 | 4/2005 | MacInnes et al. |
| 2005/0084154 A1 | 4/2005 | Li et al. |
| 2005/0091597 A1 | 4/2005 | Ackley |
| 2005/0151743 A1 | 7/2005 | Sitrick |
| 2005/0151963 A1 | 7/2005 | Pulla et al. |
| 2005/0159883 A1 | 7/2005 | Humphries et al. |
| 2005/0162419 A1 | 7/2005 | Kim et al. |
| 2005/0162523 A1 | 7/2005 | Darrell et al. |
| 2005/0171864 A1 | 8/2005 | Nakade et al. |
| 2005/0182792 A1 | 8/2005 | Israel et al. |
| 2005/0193006 A1 | 9/2005 | Bandas |
| 2005/0222987 A1 | 10/2005 | Vadon |
| 2005/0240512 A1 | 10/2005 | Quintero et al. |
| 2005/0250516 A1 | 11/2005 | Shim |
| 2005/0278749 A1 | 12/2005 | Ewert et al. |
| 2005/0283379 A1 | 12/2005 | Reber |
| 2006/0004646 A1 | 1/2006 | Schoen et al. |
| 2006/0004850 A1 | 1/2006 | Chowdhury |
| 2006/0006238 A1 | 1/2006 | Singh |
| 2006/0012677 A1 | 1/2006 | Neven et al. |
| 2006/0013481 A1 | 1/2006 | Park et al. |
| 2006/0015492 A1 | 1/2006 | Keating et al. |
| 2006/0032916 A1 | 2/2006 | Mueller et al. |
| 2006/0038833 A1 | 2/2006 | Mallinson et al. |
| 2006/0047825 A1 | 3/2006 | Steenstra et al. |
| 2006/0058948 A1 | 3/2006 | Blass et al. |
| 2006/0059434 A1 | 3/2006 | Boss et al. |
| 2006/0064346 A1 | 3/2006 | Steenstra et al. |
| 2006/0071945 A1 | 4/2006 | Anabuki |
| 2006/0071946 A1 | 4/2006 | Anabuki et al. |
| 2006/0099959 A1 | 5/2006 | Staton et al. |
| 2006/0116935 A1 | 6/2006 | Evans |
| 2006/0120686 A1 | 6/2006 | Liebenow |
| 2006/0145837 A1 | 7/2006 | Horton et al. |
| 2006/0149625 A1 | 7/2006 | Koningstein |
| 2006/0149638 A1 | 7/2006 | Allen |
| 2006/0178782 A1 | 8/2006 | Pechtl et al. |
| 2006/0184013 A1 | 8/2006 | Emanuel et al. |
| 2006/0190293 A1 | 8/2006 | Richards |
| 2006/0195428 A1 | 8/2006 | Peckover |
| 2006/0211453 A1 | 9/2006 | Schick |
| 2006/0218153 A1 | 9/2006 | Voon et al. |
| 2006/0236257 A1 | 10/2006 | Othmer et al. |
| 2006/0240862 A1 | 10/2006 | Neven et al. |
| 2006/0270421 A1 | 11/2006 | Phillips et al. |
| 2007/0005576 A1 | 1/2007 | Cutrell et al. |
| 2007/0015586 A1 | 1/2007 | Huston |
| 2007/0024469 A1 | 2/2007 | Chou |
| 2007/0038944 A1 | 2/2007 | Carignano et al. |
| 2007/0060112 A1 | 3/2007 | Reimer |
| 2007/0078846 A1 | 4/2007 | Gulli et al. |
| 2007/0091125 A1 | 4/2007 | Takemoto et al. |
| 2007/0098234 A1 | 5/2007 | Fiala |
| 2007/0100740 A1 | 5/2007 | Penagulur et al. |
| 2007/0104348 A1 | 5/2007 | Cohen |
| 2007/0122947 A1 | 5/2007 | Sakurai et al. |
| 2007/0133947 A1 | 6/2007 | Armitage et al. |
| 2007/0143082 A1 | 6/2007 | Degnan |
| 2007/0150403 A1 | 6/2007 | Mock et al. |
| 2007/0159522 A1 | 7/2007 | Neven |
| 2007/0172155 A1 | 7/2007 | Guckenberger |
| 2007/0198505 A1 | 8/2007 | Fuller |
| 2007/0202844 A1 | 8/2007 | Wilson et al. |
| 2007/0230817 A1 | 10/2007 | Kokojima |
| 2007/0244633 A1 | 10/2007 | Phillips et al. |
| 2007/0244924 A1 | 10/2007 | Sadovsky et al. |
| 2007/0300161 A1 | 12/2007 | Bhatia et al. |
| 2008/0003966 A1 | 1/2008 | Magnusen |
| 2008/0005074 A1 | 1/2008 | Flake et al. |
| 2008/0035725 A1 | 2/2008 | Jambunathan et al. |
| 2008/0037877 A1 | 2/2008 | Jia et al. |
| 2008/0046738 A1 | 2/2008 | Galloway et al. |
| 2008/0046956 A1 | 2/2008 | Kulas |
| 2008/0059055 A1 | 3/2008 | Geelen et al. |
| 2008/0071559 A1 | 3/2008 | Arrasvuori |
| 2008/0074424 A1 | 3/2008 | Carignano |
| 2008/0082426 A1 | 4/2008 | Gokturk et al. |
| 2008/0084429 A1 | 4/2008 | Wissinger |
| 2008/0092551 A1 | 4/2008 | Skowronski |
| 2008/0104054 A1 | 5/2008 | Spangler |
| 2008/0109301 A1 | 5/2008 | Yee et al. |
| 2008/0126193 A1 | 5/2008 | Robinson |
| 2008/0126251 A1 | 5/2008 | Wassingbo |
| 2008/0127647 A1 | 6/2008 | Leitner |
| 2008/0142599 A1 | 6/2008 | Benillouche et al. |
| 2008/0151092 A1 | 6/2008 | Vilcovsky |
| 2008/0154710 A1 | 6/2008 | Varma |
| 2008/0163311 A1 | 7/2008 | St. John-Larkin |
| 2008/0163379 A1 | 7/2008 | Robinson et al. |

(56) References Cited

U.S. PATENT DOCUMENTS

| | | |
|---|---|---|
| 2008/0165032 A1 | 7/2008 | Lee et al. |
| 2008/0170810 A1 | 7/2008 | Wu et al. |
| 2008/0176545 A1 | 7/2008 | Dicke et al. |
| 2008/0177640 A1 | 7/2008 | Gokturk et al. |
| 2008/0186226 A1 | 8/2008 | Ratnakar |
| 2008/0194323 A1 | 8/2008 | Merkli et al. |
| 2008/0201241 A1 | 8/2008 | Pecoraro |
| 2008/0205755 A1 | 8/2008 | Jackson et al. |
| 2008/0205764 A1 | 8/2008 | Iwai et al. |
| 2008/0207357 A1 | 8/2008 | Savarese et al. |
| 2008/0225123 A1 | 9/2008 | Osann et al. |
| 2008/0240575 A1 | 10/2008 | Panda et al. |
| 2008/0248815 A1 | 10/2008 | Busch |
| 2008/0255961 A1 | 10/2008 | Livesey |
| 2008/0267521 A1 | 10/2008 | Gao et al. |
| 2008/0268876 A1 | 10/2008 | Gelfand et al. |
| 2008/0278778 A1 | 11/2008 | Saino |
| 2008/0285940 A1 | 11/2008 | Kulas |
| 2008/0288338 A1 | 11/2008 | Wiseman et al. |
| 2008/0288477 A1 | 11/2008 | Kim et al. |
| 2008/0313078 A1 | 12/2008 | Payne et al. |
| 2009/0006208 A1 | 1/2009 | Grewal et al. |
| 2009/0019487 A1 | 1/2009 | Kulas |
| 2009/0028435 A1 | 1/2009 | Wu et al. |
| 2009/0028446 A1 | 1/2009 | Wu et al. |
| 2009/0034260 A1 | 2/2009 | Ziemkowski et al. |
| 2009/0076925 A1 | 3/2009 | DeWitt et al. |
| 2009/0083096 A1 | 3/2009 | Cao et al. |
| 2009/0094260 A1 | 4/2009 | Cheng et al. |
| 2009/0099951 A1 | 4/2009 | Pandurangan |
| 2009/0106127 A1 | 4/2009 | Purdy et al. |
| 2009/0109240 A1 | 4/2009 | Englert et al. |
| 2009/0110241 A1 | 4/2009 | Takemoto et al. |
| 2009/0141986 A1 | 6/2009 | Boncyk et al. |
| 2009/0144624 A1 | 6/2009 | Barnes, Jr. |
| 2009/0148052 A1 | 6/2009 | Sundaresan |
| 2009/0182810 A1 | 7/2009 | Higgins et al. |
| 2009/0228342 A1 | 9/2009 | Walker et al. |
| 2009/0232354 A1 | 9/2009 | Camp et al. |
| 2009/0235181 A1 | 9/2009 | Saliba et al. |
| 2009/0235187 A1 | 9/2009 | Kim et al. |
| 2009/0240735 A1 | 9/2009 | Grandhi et al. |
| 2009/0245638 A1 | 10/2009 | Collier et al. |
| 2009/0262137 A1 | 10/2009 | Walker et al. |
| 2009/0271293 A1 | 10/2009 | Parkhurst et al. |
| 2009/0287587 A1 | 11/2009 | Bloebaum et al. |
| 2009/0299824 A1 | 12/2009 | Barnes, Jr. |
| 2009/0304267 A1 | 12/2009 | Tapley et al. |
| 2009/0319373 A1 | 12/2009 | Barrett |
| 2009/0319388 A1 | 12/2009 | Yuan et al. |
| 2009/0319887 A1 | 12/2009 | Waltman et al. |
| 2009/0324100 A1 | 12/2009 | Kletter et al. |
| 2009/0324137 A1 | 12/2009 | Stallings et al. |
| 2009/0325554 A1 | 12/2009 | Reber |
| 2010/0015960 A1 | 1/2010 | Reber |
| 2010/0015961 A1 | 1/2010 | Reber |
| 2010/0015962 A1 | 1/2010 | Reber |
| 2010/0034469 A1 | 2/2010 | Thorpe et al. |
| 2010/0037177 A1 | 2/2010 | Golsorkhi |
| 2010/0045701 A1 | 2/2010 | Scott et al. |
| 2010/0046842 A1 | 2/2010 | Conwell |
| 2010/0048290 A1 | 2/2010 | Baseley et al. |
| 2010/0049663 A1 | 2/2010 | Kane et al. |
| 2010/0070996 A1 | 3/2010 | Liao et al. |
| 2010/0082927 A1 | 4/2010 | Riou |
| 2010/0131714 A1 | 5/2010 | Chandrasekaran |
| 2010/0153378 A1 | 6/2010 | Sardesai |
| 2010/0161605 A1 | 6/2010 | Gabrilovich et al. |
| 2010/0171758 A1 | 7/2010 | Maassel et al. |
| 2010/0171999 A1 | 7/2010 | Namikata et al. |
| 2010/0185529 A1 | 7/2010 | Chesnut et al. |
| 2010/0188510 A1 | 7/2010 | Yoo et al. |
| 2010/0198684 A1 | 8/2010 | Eraker et al. |
| 2010/0211900 A1 | 8/2010 | Fujioka |
| 2010/0214284 A1 | 8/2010 | Rieffel et al. |
| 2010/0235259 A1 | 9/2010 | Farraro et al. |
| 2010/0241650 A1 | 9/2010 | Chittar |
| 2010/0257024 A1 | 10/2010 | Holmes et al. |
| 2010/0260426 A1 | 10/2010 | Huang et al. |
| 2010/0281417 A1 | 11/2010 | Yolleck et al. |
| 2010/0287511 A1 | 11/2010 | Meier et al. |
| 2010/0289817 A1 | 11/2010 | Meier et al. |
| 2010/0293068 A1 | 11/2010 | Drakoulis |
| 2010/0312596 A1 | 12/2010 | Saffari et al. |
| 2010/0316288 A1 | 12/2010 | Ip et al. |
| 2010/0332283 A1 | 12/2010 | Ng et al. |
| 2010/0332304 A1 | 12/2010 | Higgins et al. |
| 2011/0004517 A1 | 1/2011 | Soto et al. |
| 2011/0016487 A1 | 1/2011 | Chalozin et al. |
| 2011/0029334 A1 | 2/2011 | Reber |
| 2011/0047075 A1 | 2/2011 | Fourez |
| 2011/0053642 A1 | 3/2011 | Lee |
| 2011/0055054 A1 | 3/2011 | Glasson |
| 2011/0061011 A1 | 3/2011 | Hoguet |
| 2011/0065496 A1 | 3/2011 | Gagner et al. |
| 2011/0078305 A1 | 3/2011 | Varela |
| 2011/0084983 A1 | 4/2011 | Demaine |
| 2011/0090343 A1 | 4/2011 | Alt et al. |
| 2011/0128288 A1 | 6/2011 | Petrou et al. |
| 2011/0128300 A1 | 6/2011 | Gay et al. |
| 2011/0131241 A1* | 6/2011 | Petrou .................... G06F 16/95 707/E17.014 |
| 2011/0143731 A1 | 6/2011 | Ramer et al. |
| 2011/0148924 A1 | 6/2011 | Tapley et al. |
| 2011/0153614 A1 | 6/2011 | Solomon |
| 2011/0173191 A1 | 7/2011 | Tsaparas et al. |
| 2011/0184780 A1 | 7/2011 | Alderson et al. |
| 2011/0187306 A1 | 8/2011 | Aarestrup et al. |
| 2011/0212717 A1 | 9/2011 | Rhoads et al. |
| 2011/0214082 A1* | 9/2011 | Osterhout ............ G02B 27/017 715/773 |
| 2011/0215138 A1 | 9/2011 | Crum |
| 2011/0238472 A1 | 9/2011 | Sunkada |
| 2011/0238476 A1 | 9/2011 | Carr et al. |
| 2011/0246064 A1 | 10/2011 | Nicholson |
| 2011/0277744 A1 | 11/2011 | Gordon et al. |
| 2011/0307338 A1 | 12/2011 | Carlson |
| 2011/0313874 A1 | 12/2011 | Hardie et al. |
| 2012/0072233 A1 | 3/2012 | Hanlon et al. |
| 2012/0084812 A1 | 4/2012 | Thompson et al. |
| 2012/0097151 A1 | 4/2012 | Matsuno et al. |
| 2012/0099800 A1 | 4/2012 | Llano et al. |
| 2012/0105475 A1 | 5/2012 | Tseng |
| 2012/0113141 A1 | 5/2012 | Zimmerman et al. |
| 2012/0120113 A1 | 5/2012 | Hueso |
| 2012/0126974 A1 | 5/2012 | Phillips et al. |
| 2012/0129553 A1 | 5/2012 | Phillips et al. |
| 2012/0130796 A1 | 5/2012 | Busch |
| 2012/0150619 A1 | 6/2012 | Jacob et al. |
| 2012/0165046 A1 | 6/2012 | Rhoads et al. |
| 2012/0179716 A1* | 7/2012 | Takami .................. G06F 16/35 707/771 |
| 2012/0185492 A1 | 7/2012 | Israel et al. |
| 2012/0192235 A1 | 7/2012 | Tapley et al. |
| 2012/0195464 A1 | 8/2012 | Ahn |
| 2012/0197764 A1 | 8/2012 | Nuzzi et al. |
| 2012/0215612 A1 | 8/2012 | Ramer et al. |
| 2012/0230581 A1 | 9/2012 | Miyashita et al. |
| 2012/0239483 A1 | 9/2012 | Yankovich et al. |
| 2012/0239501 A1 | 9/2012 | Yankovich et al. |
| 2012/0284105 A1 | 11/2012 | Li |
| 2012/0308077 A1* | 12/2012 | Tseng .................. G06F 16/583 382/103 |
| 2012/0323707 A1* | 12/2012 | Urban .................. G06Q 30/06 705/15 |
| 2012/0327115 A1 | 12/2012 | Chhetri et al. |
| 2013/0006735 A1 | 1/2013 | Koenigsberg et al. |
| 2013/0019177 A1 | 1/2013 | Schlossberg et al. |
| 2013/0036438 A1* | 2/2013 | Kutaragi ............ H04N 21/4821 725/38 |
| 2013/0050218 A1 | 2/2013 | Beaver et al. |
| 2013/0073365 A1 | 3/2013 | McCarthy |
| 2013/0086029 A1 | 4/2013 | Hebert |
| 2013/0103306 A1 | 4/2013 | Uetake |

(56) References Cited

U.S. PATENT DOCUMENTS

| | | | |
|---|---|---|---|
| 2013/0106910 A1 | 5/2013 | Sacco | |
| 2013/0110624 A1 | 5/2013 | Mitrovic | |
| 2013/0116922 A1 | 5/2013 | Cai et al. | |
| 2013/0144701 A1* | 6/2013 | Kulasooriya | G06Q 20/322 705/14.24 |
| 2013/0151366 A1 | 6/2013 | Godsey | |
| 2013/0170697 A1 | 7/2013 | Zises | |
| 2013/0198002 A1 | 8/2013 | Nuzzi et al. | |
| 2013/0262231 A1 | 10/2013 | Glasgow et al. | |
| 2013/0325839 A1 | 12/2013 | Goddard et al. | |
| 2014/0000701 A1 | 1/2014 | Govande et al. | |
| 2014/0007012 A1 | 1/2014 | Govande et al. | |
| 2014/0085333 A1 | 3/2014 | Pugazhendhi et al. | |
| 2014/0237352 A1 | 8/2014 | Sriganesh et al. | |
| 2014/0372449 A1 | 12/2014 | Chittar | |
| 2015/0006291 A1 | 1/2015 | Yankovich et al. | |
| 2015/0032531 A1 | 1/2015 | Yankovich et al. | |
| 2015/0052171 A1 | 2/2015 | Cheung | |
| 2015/0065177 A1 | 3/2015 | Phillips et al. | |
| 2015/0148078 A1 | 5/2015 | Phillips et al. | |
| 2015/0163632 A1 | 6/2015 | Phillips et al. | |
| 2016/0019723 A1 | 1/2016 | Tapley et al. | |
| 2016/0034944 A1 | 2/2016 | Raab et al. | |
| 2016/0117863 A1 | 4/2016 | Pugazhendhi et al. | |
| 2016/0171305 A1 | 6/2016 | Zises | |
| 2016/0364793 A1 | 12/2016 | Sacco | |
| 2017/0046593 A1 | 2/2017 | Tapley et al. | |
| 2017/0091975 A1 | 3/2017 | Zises | |
| 2018/0124513 A1 | 5/2018 | Kim et al. | |
| 2018/0189863 A1 | 7/2018 | Tapley et al. | |
| 2018/0336734 A1 | 11/2018 | Tapley et al. | |
| 2019/0266614 A1 | 8/2019 | Grandhi et al. | |
| 2021/0166061 A1 | 6/2021 | Tapley et al. | |

FOREIGN PATENT DOCUMENTS

| | | |
|---|---|---|
| CN | 1750001 A | 3/2006 |
| CN | 1802586 A | 7/2006 |
| CN | 1865809 A | 11/2006 |
| CN | 2881449 Y | 3/2007 |
| CN | 1255989 A | 6/2007 |
| CN | 101153757 A | 4/2008 |
| CN | 101515195 A | 8/2009 |
| CN | 101515198 A | 8/2009 |
| CN | 101520904 A | 9/2009 |
| CN | 101541012 A | 9/2009 |
| CN | 101764973 A | 6/2010 |
| CN | 101772779 A | 7/2010 |
| CN | 101893935 A | 11/2010 |
| CN | 102084391 A | 6/2011 |
| CN | 102156810 A | 8/2011 |
| CN | 102194007 A | 9/2011 |
| CN | 102667913 A | 9/2012 |
| CN | 103443817 A | 12/2013 |
| CN | 104081379 A | 10/2014 |
| CN | 104656901 A | 5/2015 |
| CN | 105787764 A | 7/2016 |
| EP | 1365358 A2 | 11/2003 |
| EP | 1710717 A1 | 10/2006 |
| EP | 2015244 A1 | 1/2009 |
| EP | 2034433 A1 | 3/2009 |
| GB | 2418275 A | 3/2006 |
| JP | 56-085650 A | 7/1981 |
| JP | 57-164286 A | 10/1982 |
| JP | 59-107144 A | 6/1984 |
| JP | 59-196956 A | 11/1984 |
| JP | 59-196211 U | 12/1984 |
| JP | 60-078250 A | 5/1985 |
| JP | 61-115805 U | 7/1986 |
| JP | 63-013113 B2 | 3/1988 |
| JP | 11-191118 A | 7/1999 |
| JP | 2942851 B2 | 8/1999 |
| JP | 2000-110515 A | 4/2000 |
| JP | 2000-279944 A | 10/2000 |
| JP | 2001-283079 A | 10/2001 |
| JP | 2001-309323 A | 11/2001 |
| JP | 2001-344479 A | 12/2001 |
| JP | 2002-004943 A | 1/2002 |
| JP | 2002-099826 A | 4/2002 |
| JP | 2003-014316 A | 1/2003 |
| JP | 2003-022395 A | 1/2003 |
| JP | 2004-326229 A | 11/2004 |
| JP | 2005-337966 A | 12/2005 |
| JP | 2006-209658 A | 8/2006 |
| JP | 2006-351024 A | 12/2006 |
| JP | 3886045 B2 | 2/2007 |
| JP | 2007-172605 A | 7/2007 |
| JP | 3143216 U | 7/2008 |
| JP | 2010-039908 A | 2/2010 |
| JP | 2010-141371 A | 6/2010 |
| JP | 2010-524110 A | 7/2010 |
| JP | 2011-209934 A | 10/2011 |
| JP | 2012-529685 A | 11/2012 |
| KR | 10-2006-0126717 A | 12/2006 |
| KR | 10-2007-0014532 A | 2/2007 |
| KR | 10-0805607 B1 | 2/2008 |
| KR | 10-0856585 B1 | 9/2008 |
| KR | 10-2009-0056792 A | 7/2009 |
| KR | 10-2009-0070900 A | 7/2009 |
| KR | 10-2010-0067921 A | 6/2010 |
| KR | 10-2010-0071559 A | 6/2010 |
| KR | 10-2011-0082690 A | 7/2011 |
| WO | 99/44153 A1 | 9/1999 |
| WO | 01/22326 A1 | 3/2001 |
| WO | 2005/072157 A2 | 8/2005 |
| WO | 2008/003966 A1 | 1/2008 |
| WO | 2008/051538 A2 | 5/2008 |
| WO | 2009/111047 A2 | 9/2009 |
| WO | 2010/084585 A1 | 12/2010 |
| WO | 2010/141939 A1 | 12/2010 |
| WO | 2011/070871 A1 | 6/2011 |
| WO | 2011/087797 A2 | 7/2011 |
| WO | 2012/106096 A1 | 8/2012 |
| WO | 2013/063299 A1 | 5/2013 |
| WO | 2013/101903 A2 | 7/2013 |

OTHER PUBLICATIONS

Amendment After Notice of Allowance Under 37 CFR filed on Jul. 27, 2020 U.S. Appl. No. 13/537,482, 10 Pages.

Applicant Initiated Interview Summary received for U.S. Appl. No. 13/537,482, dated Feb. 23, 2018, 3 pages.

Applicant Initiated Interview Summary received for U.S. Appl. No. 13/537,482, dated Sep. 27, 2016, 3 pages.

Applicant Initiated Interview Summary Received for U.S. Appl. No. 13/537,482, dated Sep. 12, 2019, 3 pages.

Final Office Action received for U.S. Appl. No. 13/537,482, dated Dec. 13, 2018, 18 pages.

Final Office Action received for U.S. Appl. No. 13/537,482, dated May 8, 2014, 20 pages.

Final Office Action received for U.S. Appl. No. 13/537,482, dated May 22, 2015, 32 pages.

Final Office Action received for U.S. Appl. No. 13/537,482, dated Nov. 7, 2016, 17 pages.

Final Office Action received for U.S. Appl. No. 13/537,482, dated Nov. 24, 2017, 19 pages.

Final Office Action Received for U.S. Appl. No. 13/537,482, dated Jan. 7, 2020,25 Pages.

Non-Final Office Action received for U.S. Appl. No. 13/537,482, dated Jan. 6, 2014, 25 pages.

Non-Final Office Action received for U.S. Appl. No. 13/537,482, dated Jun. 24, 2016, 19 pages.

Non-Final Office Action received for U.S. Appl. No. 13/537,482, dated Jun. 28, 2017, 25 pages.

Non-Final Office Action received for U.S. Appl. No. 13/537,482, dated Nov. 6, 2014, 24 pages.

Non-Final Office Action Received for U.S. Appl. No. 13/537,482 dated May 16, 2018, 20 pages.

Non-Final Office Action received for U.S. Appl. No. 13/537,482, dated Jun. 20, 2019, 22 pages.

(56) References Cited

OTHER PUBLICATIONS

Notice of Allowance received for U.S. Appl. No. 13/537,482, dated Apr. 8, 2020,13 pages.
Notice of Allowance received for U.S. Appl. No. 13/537,482, dated Jul. 13, 2020, 12 pages.
Response to Final Office Action filed on Feb. 7, 2017 for U.S. Appl. No. 13/537,482, dated Nov. 7, 2016, 17 pages.
Response to Final Office Action filed on Feb. 19, 2018 for U.S. Appl. No. 13/537,482, dated Nov. 24, 2017, 18 pages.
Response to Final Office Action filed on Mar. 13, 2019, for U.S. Appl. No. 13/537,482, dated Dec. 13, 2018, 16 pages.
Response to Final Office Action Filed on Mar. 9, 2020, for U.S. Appl. No. 13/537,482, dated Jan. 37,2020, 15 Pages.
Response to Final Office Action filed on Nov. 23, 2015 for U.S. Appl. No. 13/537,482, dated May 22, 2015, 10 pages.
Response to Final Office Action filed on Sep. 8, 2014 for U.S. Appl. No. 13/537,482, dated May 8, 2014, 10 pages.
Response to Non-Final Office Action filed on Apr. 6, 2015 for U.S. Appl. No. 13/537,482, dated Nov. 6, 2014, 8 pages.
Response to Non-Final Office Action filed on Apr. 22, 2014 for U.S. Appl. No. 13/537,482, dated Jan. 6, 2014, 10 pages.
Response to Non-Final Office Action filed on Nov. 13, 2019 for U.S. Appl. No. 13/537,482 dated Jun. 20, 2019, 16 pages.
Response to Non-Final Office Action filed on Sep. 17, 2018, for U.S. Appl. No. 13/537,482, dated May 16, 2018, 13 pages.
Response to Non-Final Office Action filed on Sep. 23, 2016 for U.S. Appl. No. 13/537,482, dated Jun. 24, 2016, 11 pages.
Response to Non-Final Office Action filed on Sep. 28, 2017 for U.S. Appl. No. 13/537,482, dated Jun. 28, 2017, 20 pages.
Response to Rule 312 Communication Received for U.S. Appl. No. 13/537,482, dated Aug. 31, 2020, 2 pages.
Applicant Initiated Interview Summary Received for U.S. Appl. No. 15/337,899, dated May 26, 2020, 3 pages.
Corrected Notice of Allowability received for U.S. Appl. No. 15/337,899, dated Sep. 10, 2020, 2 pages.
Notice of Allowance received for U.S. Appl. No. 15/337,899, dated Jul. 30, 2020, 7 pages.
Response to Non-Final Office Action Filed on May 21, 2020, for U.S. Appl. No. 15/337,899, dated Feb. 5, 2020, 12 pages.
Notice of Allowance received for U.S. Appl. No. 15/337,899, dated Nov. 17, 2020, 7 Pages.
Corrected Notice of Allowabillity Received for U.S. Appl. No. 15/337,899, dated Feb. 24, 2021, 2 Pages.
Troaca, "S60 Camera Phones Get Image Recognition Technology", http://news.softpedia.com/news/S60-Camera-Phones-Get-Image-Recognition-Technology-79666.shtml, Feb. 27, 2008, pp. 1-2.
Final Office Action Received for U.S. Appl. No. 15/337,899 dated Nov. 14, 2019, 20 pages.
Non Final Office Action received for U.S. Appl. No. 17/177,862, dated Aug. 24, 2021, 10 pages.
U.S. Appl. No. 13/537,482, filed Jun. 29, 2012, Issued.
"SnapTell: Technology," Retrieved from the Internet: <URL: http://!web.archive.org/web/20071117023817/http://www.snaptell.com/technology/index.htm>, Nov. 17, 2007, 1 page.
"The ESP Game," Retrieved from the Internet: <URL: http://www.espgame.org/instructions.html>. Accessed on Nov. 13, 2007, 2 pages.
Applicant Initiated Interview Summary received for U.S. Appl. No. 12/371,882, dated Apr. 27, 2016, 3 pages.
Applicant Initiated Interview Summary received for U.S. Appl. No. 12/371,882, dated Feb. 27, 2012, 3 pages.
Applicant Initiated Interview Summary received for U.S. Appl. No. 12/371,882, dated Jul. 21, 2015, 3 pages.
Applicant Initiated Interview Summary received for U.S. Appl. No. 12/371,882, dated Nov. 20, 2013, 3 pages.
Final Office Action received for U.S. Appl. No. 12/371,882, dated Jun. 25, 2015, 27 pages.
Final Office Action received for U.S. Appl. No. 12/371,882, dated Dec. 18, 2013, 26 pages.
Final Office Action received for U.S. Appl. No. 12/371,882, dated Nov. 14, 2011, 21 pages.
Final Office Action received for U.S. Appl. No. 12/371,882, dated Mar. 13, 2013, 24 pages.
Non-Final Office Action received for U.S. Appl. No. 12/371,882, dated Jun. 8, 2011, 22 pages.
Non-Final Office Action received for U.S. Appl. No. 12/371,882, dated Mar. 12, 2015, 29 pages.
Non-Final Office Action received for U.S. Appl. No. 12/371,882, dated Aug. 30, 2013, 20 pages.
Non-Final Office Action received for U.S. Appl. No. 12/371,882, dated Feb. 8, 2016, 37 pages.
Non-Final Office Action received for U.S. Appl. No. 12/371,882, dated Oct. 23, 2012, 21 pages.
Notice of Allowance received for U.S. Appl. No. 12/371,882, dated Jul. 20, 2016, 5 pages.
Preliminary amendment filed for U.S. Appl. No. 12/371,882, dated Feb. 16, 2009, 4 pages.
Preliminary Amendment received for U.S. Appl. No. 12/371,882, filed Jun. 19, 2009, 3 pages.
Response to Final Office Action filed on Jun. 13, 2013, for U.S. Appl. No. 12/371,882, dated Mar. 13, 2013, 14 pages.
Response to Final Office Action filed on Mar. 14, 2012, for U.S. Appl. No. 12/371,882, dated Nov. 14, 2011, 10 pages.
Response to Final Office Action filed on May 8, 2014, for U.S. Appl. No. 12/371,882, dated Dec. 18, 2013, 12 Pages.
Response to Final Office Action filed on Sep. 25, 2015, for U.S. Appl. No. 12/371,882, dated Jun. 25, 2015, 13 pages.
Response to Non-Final Office Action filed on Jan. 22, 2013, for U.S. Appl. No. 12/371,882, dated Oct. 23, 2012, 12 pages.
Response to Non-Final Office Action filed on May 9, 2016, for U.S. Appl. No. 12/371,882, dated Feb. 8, 2016, 14 pages.
Response to Non-Final Office Action filed on Sep. 8, 2011, for U.S. Appl. No. 12/371,882, dated Jun. 8, 2011, 13 pages.
Response to Non-Final Office Action filed on Dec. 2, 2013 for U.S. Appl. No. 12/371,882, dated Aug. 30, 2013, 13 pages.
Terada, "New Cell Phone Services Tap Image-Recognition Technologies", Retrieved from the Internet: <URL: http://search.japantimes.co.Jp/cgi-bin/nb20070626a1.html>, Jun. 26, 2007, pp. 1-3.
Non-Final Office Action received for U.S. Appl. No. 12/398,957, dated Jul. 29, 2011, 23 pages.
Non-Final Office Action received for U.S. Appl. No. 12/398,957, dated Mar. 29, 2012, 23 pages.
Response to Non-Final Office Action filed on Dec. 29, 2011 for U.S. Appl. No. 12/398,957, dated Jul. 29, 2011, 15 pages.
Applicant Initiated Interview Summary received for U.S. Appl. No. 12/406,016, dated May 15, 2012, 3 pages.
Final Office Action received for U.S. Appl. No. 12/406,016, dated Feb. 29, 2012, 25 pages.
Non-Final Office Action received for U.S. Appl. No. 12/406,016, dated Jun. 21, 2011, 21 pages.
Response to Final Office Action filed on May 17, 2012, for U.S. Appl. No. 12/406,016, dated Feb. 29, 2012, 16 pages.
Response to Non Final Office Action filed on Sep. 21, 2011, for U.S. Appl. No. 12/406,016, dated Jun. 21, 2011, 17 pages.
Redlaser, "Redlaser—Impossibly Accurate Barcode Scanning", Retrieved from the Internet URL: <http://redlaser.com/index.php>, Jul. 8, 2011, pp. 1-2.
Patterson, "Amazon Iphone App Takes Snapshots, Looks for a Match", Retrieved from the Internet: <URL:http://tech.yahoo.com/blogs/patterson/30983>, Dec. 3, 2008, 3 pages.
Parker, "Algorithms for Image Processing and Computer Vision", Wiley Computer Publishing, 1997, pp. 23-29.
Occipitaihq, "RedLaser 2.0: Realtime iPhone UPC barcode scanning", Available Online on URL: <https://www.youtube.com/watch?v=9_hFGsmx_6k>, Jun. 16, 2009, 2 pages.
Mello Jr.,"Pongr Giving Cell Phone Users Way to Make Money", Retrieved from the Internet URL; <https://www.ocworld.com/article/240209/pongr_giving_cell_phone_users_way_to_make_money.html>, Sep. 18, 2011, 4 pages.
Gonsalves, "Amazon Launches Experimental Mobile Shopping Feature", Retrieved from the Internet: <URL: http://www.

(56) References Cited

OTHER PUBLICATIONS informationweek.com/news/internet/retail/showArticle.jhtml?articleID=212201750&subSection=News, Dec. 3, 2008, 1 page.

Ahn et al., "Labeling Images with a Computer Game", Retrieved from the Internet URL:<http://ael.gatech.edu/cs6452f13/files/2013/08/labeling-images.pdf>, Proceedings of the SIGCHI Conference on Human Factors in Computing Systems, 2004, 8 pages.

U.S. Appl. No. 61/033,940, "Image Recognition as a Service" filed on Mar. 5, 2008, 45 pages.

Response to First Action Interview Office Action summary Filed on Sep. 6, 2019, for U.S. Appl. No. 15/337,899, dated Jun. 25, 2019, 14 Pages.

Response to First Action Interview—Pre-Interview Communication filed on May 16, 2019, for U.S. Appl. No. 15/337,899, dated Mar. 19, 2019, 10 pages.

Response to Final Office Action filed on Jan. 13, 2020 for U.S. Appl. No. 15/337,899, dated Nov. 14, 2019, 15 pages.

Preliminary Amendment for U.S. Appl. No. 15/337,899, filed Nov. 11, 2016, 8 pages.

Non-Final Office Action received for U.S. Appl. No. 15/337,899 dated Feb. 5, 2020, 11 pages.

First Action Interview-Office Action Summary received for U.S. Appl. No. 15/337,899, dated Jun. 25, 2019, 6 pages.

First Action Interview—Pre-Interview Communication received for U.S. Appl. No. 15/337,899, dated Mar. 19, 2019, 6 pages.

About the Eclipse Foundation, Retrieved from Internet URL: <http://www.eclipse.org/org/>, Accessed on Nov. 2, 2021, 2 pages.

Apache Tomcat, The Apache Software Foundation, Retrieved from the Internet URL: <http://tomcal.apache.org/>, Accessed on Nov. 2, 2021, 4 pages.

U.S. Appl. No. 11/690,720, Final Office Action dated Apr. 27, 2010, 10 pgs.

U.S. Appl. No. 13/050,769, Final Office Action dated Jun. 17, 2013, 10 pgs.

U.S. Appl. No. 13/050,769, Non Final Office Action dated Jan. 11, 2013, 10 pgs.

U.S. Appl. No. 14/611,210, Notice of Allowance dated Jun. 16, 2014, 8 pgs.

U.S. Appl. No. 14/611,210, Pre-Interview First Office Action dated Mar. 22, 2016, 4 pgs.

Araki et al., "Follow-The-Triai-Fitter: Real-Time Dressing without Undressing", Retrieved from the internet URL: https://dialog.proquest.com/professional/printviewfile?accountid=142257>, Dec. 1, 2008, 8 pages.

Chinese Application Serial No. 200980107871.0, Decision of Reexamination dated Nov. 30, 2015, 11 pages English Translation only.

Chinese Application Serial No. 200980107871.0, Notification of Reexamination dated Aug. 7, 2015, 22 pages (13 pages of Official Copy and 9 pages of English Translation).

Chinese Application Serial No. 200980107871.0, Office Action dated Feb. 2, 2012, 11 pages (5 pages of Official Copy and 6 pages of English Translation).

Chinese Application Serial No. 200980107871.0, Office Action dated Jun. 5, 2014, 15 pages (9 pages of English translation of claims and 6 pages of official copy).

Chinese Application Serial No. 200980107871.0, Office Action dated May 3, 2013, 18 pages (10 pages of English translation and 8 pages of official copy).

Chinese Application Serial No. 200980107871.0, Office Action dated Nov. 1, 2012, 13 pages (5 pages of Official Copy and 8 pages of English Translation).

Chinese Application Serial No. 201080059424.5, Office Action dated Apr. 21, 2014, 19 pages (11 pages English translation and 8 pages official copy).

Chinese Application Serial No. 201510088798.4, Office Action dated Mar. 17, 2017, 23 pages (14 pages of English Translation and 9 pages of Official Copy).

Communication Pursuant to Article 94(3) EPC received for European Patent Application No. 09717996.4, dated Jul. 23, 2013, 7 pages.

Communication Pursuant to Article 94(3) EPC received for European Patent Application No. 10803429.9, dated Aug. 30, 2018, 6 pages.

Communication Pursuant to Article 94(3) EPC received for European Patent Application No. 10803429.9, dated Feb. 16, 2018, 8 pages.

Communication Pursuant to Article 94(3) EPC received for European Patent Application No. 17171025.4, dated Feb. 7, 2020, 6 pages.

Communication under Rule 71(3) for European Patent Application No. 10803429.9, dated Jun. 6, 2019, 7 pages.

Decision of Rejection Received for Chinese Patent Application No. 201610108229.6, dated Mar. 26, 2020, 11 pages (7 pages of Official Copy & 4 pages of English Translation of Claims).

Draw something, Retrieved from the Internet URL: <http://omgpop.com/drawsomelhing>, Accessed on Feb. 16, 2018, 2 pages.

DS Development Software," Email Protocols: IMAP, POP3, SMTP and HTTP", Retrieved from the Internet UR: :<http://www.emailaddressmanager.com/tips/protocol.html>,(Copyrights) 2004-2013 Digital Software Development, Accessed on Nov. 8, 2021, 1 Page.

Duke University, "How to Write Advertisements that Sell", Company: System, The Magazine of Business, 1912, 66 pages.

EBay Developers Program, Retrieved from the Internet URL :<htlps://developer.ebay.com/common/api/>, Accessed on Nov. 8, 2021, 3 pages.

European Application Serial No. 09717996.4, Extended European Search Report dated Feb. 17, 2011, 6 pgs.

European Application Serial No. 10803429.9, Extended European Search Report dated Jun. 17, 2015, 7 pgs.

Extended European Search Report received for European Patent Application No. 17171025.4, dated Sep. 4, 2017, 7 pages.

Extended European Search Report Received for European Patent Application No. 19184977.7 dated Sep. 26, 2019, 10 pages.

Final Office Action received for U.S. Appl. No. 13/194,584, dated Jan. 22, 2016, 27 pages.

Final Office Action received for U.S. Appl. No. U.S. Appl. No. 12/398,957, dated Jan. 17, 2020, 24 pages.

Final Office Action received for U.S. Appl. No. U.S. Appl. No. 12/398,957, dated Jan. 22, 2018, 20 pages.

Final Office Action received for U.S. Appl. No. U.S. Appl. No. 12/398,957, dated Jun. 24, 2020, 17 pages.

Final Office Action received for U.S. Appl. No. 13/194,584, dated Jul. 27, 2017, 35 pages.

Final Office Action received for U.S. Appl. No. 11/140,273, dated Dec. 13, 2007, 11 pages.

Final Office Action received for U.S. Appl. No. 11/140,273, dated Jul. 15, 2009, 11 pages.

Final Office Action received for U.S. Appl. No. 11/690,720, dated Nov. 9, 2011, 17 pages.

Final Office Action received for U.S. Appl. No. 12/398,957, dated Jul. 18, 2014, 27 pages.

Final Office Action received for U.S. Appl. No. 12/398,957, dated Nov. 7, 2012, 22 pages.

Final Office Action received for U.S. Appl. No. 12/644,957, dated Aug. 26, 2013, 19 pages.

Final Office Action received for U.S. Appl. No. 12/644,957, dated Jul. 11, 2014, 25 pages.

Final Office Action received for U.S. Appl. No. 13/324,834, dated Mar. 27, 2014, 22 pages.

Final Office Action received for U.S. Appl. No. 13/324,834, dated Apr. 28, 2015, 20 pages.

Final Office Action received for U.S. Appl. No. 13/324,834, dated Jan. 13, 2014, 13 Pages.

Final Office Action received for U.S. Appl. No. 13/339,235, dated Aug. 29, 2012, 10 pages.

Final Office Action received for U.S. Appl. No. 13/339,235, dated Dec. 2, 2014, 7 pages.

Final Office Action received for U.S. Appl. No. 13/339,235, dated Jan. 27, 2017, 16 pages.

Final Office Action received for U.S. Appl. No. 13/361,196, dated Jan. 22, 2013, 15 pages.

(56) References Cited

OTHER PUBLICATIONS

Final Office Action received for U.S. Appl. No. 13/436,370, dated Jun. 12, 2015, 18 pages.
Final Office Action received for U.S. Appl. No. 13/436,370, dated Oct. 13, 2016, 14 pages.
Final Office Action received for U.S. Appl. No. 14/473,809, dated Apr. 14, 2016, 23 pages.
Final Office Action received for U.S. Appl. No. 14/486,518, dated Dec. 8, 2015, 7 pages.
Final Office Action received for U.S. Appl. No. 14/512,350, dated Aug. 23, 2017, 21 pages.
Final Office Action received for U.S. Appl. No. 14/868,105, dated Apr. 12, 2017, 22 pages.
Final Office Action received for U.S. Appl. No. 16/406,787, dated Aug. 18, 2022, 12 pages.
Final Office Action received for U.S. Appl. No. 17/177,862, dated Mar. 21, 2022, 10 pages.
Final Office Action received for U.S. Appl. No. 14/512,350, dated Nov. 30, 2015, 7 pages.
Final Office Action received for U.S. Appl. No. 14/486,518, dated Nov. 16, 2017, 19 pages.
First Action Interview Office Action Summary received for U.S. Appl. No. 14/534,797, dated Feb. 18, 2016, 5 pages.
First Action Interview Office Action Summary received for U.S. Appl. No. 14/624,083, dated Apr. 8, 2016, 1 pages.
First Examiner Report received for Indian Patent Application No. 6557/DELNP/2010, dated Apr. 11, 2017, 11 pages.
Geekery, "Proposal for Free, Open Source Cell Phone Location Service", Retrieved from the Internet URL: <//crud.blog/2004/03/06/proposal-for-free-open-source-cell-phone-location-service/>, Mar. 6, 2004, 8 pages.
Gmail, Retrieved from Internet URL: https://www.gmail.com. Accessed on Nov. 10, 2021, 7 Pages.
GOCR, "Open-Source Character Recognition", Retrieved from Internet URL: <https://www-e.ovgu.de/jschulen/ocr/download.html>, Accessed on Nov. 3, 2021, 2 pages.
Google Play, "AgingBooth", Retrieved from the Internet URL: <https://play.google.com/store/apps/details?id=com.piviandco.agingbooth&hl=en_IN>, Jan. 7, 2019, 4 pages.
Halfbakery: Buddy Locator, [Online], Retrieved from the Internet: <URL: http://www.halfbakery.com/idea/Buddy_20Locator#1055455737>, (Jun. 11, 2003), 3 pages.
Halfbakery: Mobile Phone Utility, Retrieved from the Internet URL: <http://www.halfbakery.com/idea/mobile_20phone_20utility#1073585857>, Jan. 8, 2004, 2 pages.
Halfbakery: Mobile Proximity Link, [Online], Retrieved from the Internet: <URL: http://www.halfbakerv.com/idea/Mobile_20Proximity_20Link#1001923289>, (Sep. 30, 2001).
International Search Report and Written Opinion of the International Searching Authority, issued in connection with Int'l Appl. No. PCT/US2009/001419, dated Sep. 30, 2009 (8 pages).
International Search Report and Written Opinion of the International Searching Authority, issued in connection with Int'l Appl. No. PCT/US2010/061628, dated Aug. 12, 2011 (6 pages).
iPhone—Apple, Oh.So.Pro, Retrieved from the Internet URL :<http://www.apple.com/iphone/>, Accessed on Nov. 10, 2021, 12 pages.
Java Servlet Technology Overview, Retrieved from Internet URL :<https://www.oracle.com/java/technologies/servlet-technology.html>. Accessed on Nov. 10, 2021, 2 pages.
Kan et al., "Applying QR Code in Augmented Reality Applications", VRCAI, Dec. 15, 2009, pp. 253-258.
Klemperer, "Auctions: Theory and Practice", Princeton University Press, 2004, 15 pages.
Korean Application Serial No. 2012-7019181, Notice of Appeal filed Feb. 4, 2015, 24 pages (Including English Translation of claims).
Korean Application Serial No. 2012-7019181, Notice of Final Rejection dated Nov. 3, 2014, with English translation of claims, 6 pgs.
Korean Application Serial No. 2012-7019181, Notice of Reason for Refusal dated Feb. 23, 2016, 12 pages (5 pages of English Translation and 7 pages of Official Copy).
Korean Application Serial No. 2012-7019181, Notification of Reason for Refusal dated Nov. 18, 2013, 12 pages (6 pages English translation & 6 pages official copy).
Korean Application Serial No. 2012-7019181, Office Action dated Jun. 26, 2014, with English translation, 5 pgs.
Korean Application Serial No. 2014-7004160, Reasons for Rejection dated Mar. 2, 2016, with English translation, 7 pgs.
Kraft, "Real Time Baseball Aguemented Reality", Washington University in Sl. Louis, Dec. 6, 2011, 11 pages.
Madeleine, "Terminator 3 Rise of Jesus! Deutsch", "Retrieved from the Internet URL: <https://www.youtube.com/watch?v=Oj3o7HFcgzE>", Jun. 12, 2010, 2 pages.
MLB At Bat 11, Retrieved from the Internet: <URL: http://texas.rangers.mlb.com/mobile/atbat/?c id=tex>, Accessed in Apr. 19, 2018, 6 pages.
Mobitv,"Mobi IV", Retrieved from the Internet: <URL: http://www.mobitv.com/>, Accessed on Mar. 30, 2015, 1 page.
Mulloni et al., "Handheld Augmented Reality Indoor Navigation With Activity-Based Instructions", Proceedings of the 3th International Conference on Human Computer Interaction With Mobile Devices and Services, 2011, 10 pages.
Newby, "Facebook, Politico to measure sentiment of GOP candidates by collecting posts", 2006-2012 Clarity Digital 3roup LLC d/b/a Examiner.com, Jun. 28, 2012, 3 pages.
Non-Final Office Action received for U.S. Appl. No. U.S. Appl. No. 15/250,588, dated Sep. 22, 2017, 16 pages.
Non-Final Office Action received for U.S. Appl. No. U.S. Appl. No. 15/337,899 dated Feb. 5, 2020, 11 pages.
Non-Final Office Action Received for U.S. Appl. No. U.S. Appl. No. 16/046,434, dated Aug. 21, 2019, 23 pages.
Non-Final Office Action received for U.S. Appl. No. 11/140,273, dated Feb. 26, 2010, 11 pages.
Non-Final Office Action received for U.S. Appl. No. 11/140,273, dated Jul. 3, 2008, 11 pages.
Non-Final Office Action received for U.S. Appl. No. 11/140,273, dated May 31, 2007, 10 pages.
Non-Final Office Action received for U.S. Appl. No. 11/690,720, dated May 17, 2011, 11 pages.
Non-Final Office Action received for U.S. Appl. No. 11/690,720, dated Sep. 25, 2009, 8 pages.
Non-Final Office Action Received for U.S. Appl. No. 12/398,957, dated Dec. 9, 2019, 10 pages.
Non-Final Office Action received for U.S. Appl. No. 12/398,957, dated May 2, 2017, 19 pages.
Non-Final Office Action received for U.S. Appl. No. 12/398,957, dated Oct. 17, 2019, 11 pages.
Non-Final Office Action received for U.S. Appl. No. 12/398,957, dated Sep. 19, 2013, 21 pages.
Non-Final Office Action received for U.S. Appl. No. 12/406,016, dated Oct. 2, 2013, 21 pages.
Non-Final Office Action received for U.S. Appl. No. 12/644,957, dated Dec. 29, 2014, 20 pages.
Non-Final Office Action received for U.S. Appl. No. 12/644,957, dated Mar. 7, 2014, 21 pages.
Non-Final Office Action received for U.S. Appl. No. 12/644,957, dated Mar. 18, 2013, 17 pages.
Non-Final Office Action received for U.S. Appl. No. 13/194,584, dated Jul. 16, 2015, 27 pages.
Non-Final Office Action received for U.S. Appl. No. 13/324,834, dated Aug. 14, 2013, 12 pages.
Non-Final Office Action received for U.S. Appl. No. 13/324,834, dated Aug. 27, 2014 16 pages.
Non-Final Office Action received for U.S. Appl. No. 13/339,235, dated Aug. 18, 2014, 4 pages.
Non-Final Office Action received for U.S. Appl. No. 13/339,235, dated Aug. 28, 2017, 21 pages.
Non-Final Office Action received for U.S. Appl. No. 13/339,235, dated Feb. 12, 2015, 4 pages.
Non-Final Office Action received for U.S. Appl. No. 13/339,235, dated Mar. 16, 2012; 10 pages.

(56) References Cited

OTHER PUBLICATIONS

Non-Final Office Action received for U.S. Appl. No. 13/339,235, dated May 16, 2016, 15 pages.
Non-Final Office Action received for U.S. Appl. No. 13/339,235, dated Sep. 18, 2015, 14 pages.
Non-Final Office Action received for U.S. Appl. No. 13/361,113, dated Feb. 13, 2014, 13 pages.
Non-Final Office Action received for U.S. Appl. No. 13/361,196, dated Aug. 23, 2012, 13 pages.
Non-Final Office Action received for U.S. Appl. No. 13/361,196, dated Jan. 3, 2014, 11 pages.
Non-Final Office Action received for U.S. Appl. No. 13/361,196, dated Mar. 29, 2012, 12 pages.
Non-Final Office Action received for U.S. Appl. No. 13/380,315, dated Mar 26, 2014, 11 pages.
Non-Final Office Action received for U.S. Appl. No. 13/436,370, dated Mar. 25, 2016, 18 pages.
Non-Final Office Action received for U.S. Appl. No. 13/436,370, dated Nov. 5, 2014, 15 pages.
Non-Final Office Action received for U.S. Appl. No. 14/486,518, dated May 21, 2015, 9 pages.
Non-Final Office Action received for U.S. Appl. No. 14/486,518, dated Nov. 30, 2016, 13 pages.
Non-Final Office Action received for U.S. Appl. No. 14/512,350, dated Mar. 11, 2016, 7 pages.
Non-Final Office Action received for U.S. Appl. No. 14/512,350, dated May 22, 2015, 10 pages.
Non-Final Office Action received for U.S. Appl. No. 14/512,350, dated Nov. 2, 2016, 14 pages.
Non-Final Office Action received for U.S. Appl. No. 14/868,105, dated Dec. 12, 2016, 24 pages.
Non-Final Office Action received for U.S. Appl. No. 14/868,105, dated Nov. 14, 2017, 14 pages.
Non-final Office Action received for U.S. Appl. No. 16/406,787, dated Oct. 8, 2021, 12 pages.
Notice of Allowance Received for Korean Patent Application No. 10-2016-7025254 dated Mar. 9, 2018, 5 pages (2 pages of English Translation and 3 pages of Official Copy).
Notice of Allowance received for U.S. Appl. No. 14/990,291, dated Dec. 13, 2017, 5 pages.
Notice of Allowance received for U.S. Appl. No. 11/140,273, dated Aug. 3, 2008, 6 pages.
Notice of Allowance received for U.S. Appl. No. 11/690,720, dated Aug. 2, 2012, 7 pages.
Notice of Allowance received for U.S. Appl. No. 11/690,720, dated May 15, 2012, 7 pages.
Notice of Allowance received for U.S. Appl. No. 12/398,957, dated Jan. 2, 2019, 10 pages.
Notice of Allowance received for U.S. Appl. No. 12/398,957, dated Oct. 30, 2020, 8 pages.
Notice of Allowance received for U.S. Appl. No. 12/406,016, dated Jun. 11 , 2014, 19 pages.
Notice of Allowance received for U.S. Appl. No. 12/644,957, dated Jun. 17, 2015, 20 pages.
Notice of Allowance received for U.S. Appl. No. 13/339,235, dated Apr. 25, 2014, 8 pages.
Notice of Allowance received for U.S. Appl. No. 13/361,113, dated Aug. 1, 2014, 8 pages.
Notice of Allowance received for U.S. Appl. No. 13/361,196, dated Jun. 10, 2014, 8 pages.
Notice of Allowance received for U.S. Appl. No. 14/868,105, dated May 21, 2018, 14 pages.
Notice of Allowance received for U.S. Appl. No. 17/177,862, dated Jul. 15, 2022, 7 pages.
Notification of Reexamination received for Chinese Patent Application No. 201610108229.6 dated May 9, 2022, 10 pages (2 pages English Translation, 8 pages Official Copy).
Office Action received for Chinese Patent Application No. 200980107871.0, dated Nov. 5, 2013, 12 pages.
Office Action Received for Chinese Patent Application No. 201610108229.6 dated Nov. 15, 2018, pages (6 pages Official Copy and 9 pages English Translation).
Office Action received for Chinese Patent Application No. 201610108229.6, dated Dec. 17, 2019, 23 Pages (9 pages of Official Copy and 14 pages of English Translation).
Office Action received for Chinese patent Application No. 201610108229.6, dated May 17, 2019, 33 pages (20 pages of English Translation and 13 pages of Official copy).
Office Action received for European Patent Application No. 10803429.9, dated Aug. 22, 2012, 2 pages.
Office Action received for Korean Patent Application No. 10-2010-7022281, dated Feb. 28, 2012, 13 pages (7 pages of Official Copy and 6 pages of English Translation).
Office Action received for Korean Patent Application No. 10-2010-7022281, dated Sep. 27, 2012, 7 pages(4 pages of Official Copy and 3 pages of English Translation).
Office Action Action received for Korean Patent Application No. 10-2016-7025254, dated May 2, 2017, 7 pages (3 pages of English Translation and 4 pages Official Copy).
Office Action received for Korean Patent Application No. 10-2016-7025254, dated Oct. 13, 2016, 11 pages (6 pages of English Translation and 5 pages of Official copy).
Office Action received for Korean Patent Application No. 10-2016-7025254, dated Sep. 5, 2017, 12 pages. (5 pages of English Translation and 7 pages of Official Copy).
Office Action-First Action Interview received for U.S. Appl. No. 14/990,291, dated Oct. 13, 2017, 5 pages.
Oracle,"Java Technic:al Details", Retrieved from Internet URL: <https://www.oracle.com/java/technologies/>, Accessed on Nov. 3, 2021, 4 Pages.
Preinterview First Office Action received for U.S. Appl. No. 14/990,291, dated Aug. 10, 2017, 4 pages.
Salesforce, "Custom Application Development Software for Business", Retrieved from Internet URL: <https://www.salesforce.com/products/platform/overview/?d=70130000000liBh&internal=true>, Accessed on Oct. 4, 2021, 9 pages.
Sifry "Politico-Facebook Sentiment Analysis Will Generate "Bogus" Results, Expert Says", Retrieved from the Internet: <<http://techpresident.com/news/216181politico-facebook-sentiment-a- nalysis-bogus>, Jan. 13, 2012, Accessed on May 18, 2018, 4 pages.
Signal soft Corporation awarded location-based services patent, [Online]. Retrieved from the Internet: <URL: http://www.cellular.co.za/news 2001/04282001-signalsoft-patent.htm>, (Apr. 27, 2001), 1 pg.
Slingbox, "Sling Media, Inc.", Retrieved from the Internet URL:< http://www.slingbox.com/>, Accessed on Mar. 30 2015, 1 page.
Summons to Attend Oral Proceedings received for European Application No. 09717996.4, dated Nov. 28, 2016, 12 pages.
U.S. Appl. No. 13/194,584, Non Final Office Action dated Sep. 19, 2013, 25 pgs.
U.S. Appl. No. 13/624,682, Non Final Office Action dated Jan. 22, 2015, 9 pgs.
U.S. Appl. No. 13/624,682, Notice of Allowance dated Jun. 8, 2015, 5 pgs.
U.S. Appl. No. 13/624,682, Notice of Allowance dated Oct. 1, 2015, 7 pgs.
U.S. Appl. No. 14/473,809, Non Final Office Action dated Aug. 13, 2015, 21 pgs.
Usdatanow, Networks in Motion Named Semi-Finalist for Wireless LBS Challenge, [Online]. Retrieved from the Internet: <URL: http://tmcnet.com/usubmit/2004/Mar/1025200.htm>, (Mar. 18, 2004), 2 pages.
Vassilios et al., "Archeoguide: An Augmented Reality Guide for Archaeological Sites", IEEE Computer Graphics and application vol. 22, No. 5, Sep./Oct. 2002, pp. 52-60.
Vlahakis et al., "Archeoguide: First Results of an Augmented Reality, Mobile Computing System in Cultural Heritage Sites", Virtual Reality, Archeology, and Cultural Heritage, 2001, 10 pages.
W3 Schools, "Introduction to XML", Retrieved from the Internet URL :<https://www.w3schools.com/xml/xml_whatis.sp>, Accessed on Nov. 8, 2021, 7 pages.

(56) References Cited

OTHER PUBLICATIONS

W3C, Extensible Markup Language {XML} 1.0 {Fourth Edition):, Retrieved from the Internet URL :<http://www.w3.org/TR/2006/REC-xml-20060816/#sec-origin-goals>, Aug. 16, 2006, 30 pages.

W3C, "URIs, Addressability, and the use of HTTP GET and POST", Retrieved from Internet URL: <https://www.w3.prg/2001/tag/doc/whenToUseGet.html>, Mar. 21, 2004, 9 Pages.

Walther et al., "Selective Visual Attention Enables Learning and Recognition of Multiple Objects in Cluttered Scenes", Accessed on Jun. 15, 2005, 23 pages.

WhatIs.com, Retrieved from the Internet URL :<http://searchexchange.techtargel.com/sDefinition/0sid43_gci212805,00.html>, Accessed on Nov. 8, 2021, 5 pages.

Wikipedia, "Definition of Homogeneous Coordinates", Retrieved from the internet URL: <https://web.archive.org/web/20110305185824/http://en.wikipedia.org/wi- ki/Homogeneous_coordinates>, Accessed on Apr. 18, 2018, 8 pages.

Wikipedia, "Polar Coordinate System", Retrieved from the Intent URL: <http://en.wikipedia.org/wiki/Polar_coordinate_system>, Oct, 8, 2011, 12 pages.

YouTube., "RedLaser 2.0: Realtime iPhone UPC Barcode Scanning", Retrieved from the Internet URL: <https://www.youtube.com/watch?v=9_hFGsmx_6k>, Jun. 16, 2009, pp. 1-2.

Notice Of Allowance received for U.S. Appl. No. 17/177,862, dated Nov. 2, 2022, 5 Pages.

Non-Final Office Action received for U.S. Appl. No. 16/406,787, dated Dec. 6, 2022, 11 pages.

Reexamination Decision received for Chinese Patent Application No. 201610108229.6 dated Nov. 4, 2022, 14 Pages (1 Page of English translation and 13 Pages of Official Copy).

\* cited by examiner

CONTEXTUAL MENUS BASED ON IMAGE RECOGNITION

CROSS REFERENCE TO RELATED APPLICATIONS

This application is a Continuation of application Ser. No. 13/537,482 filed on Jun. 29, 2012, entitled "CONTEXTUAL MENUS BASED ON IMAGE RECOGNITION," the entire contents of this application is incorporated herein by reference in its entirety.

FIELD

The present disclosure relates generally to information retrieval. In an example embodiment, the disclosure relates to providing contextual menus based on images.

BACKGROUND

Online shopping and other publication systems provide a number of publishing and shopping mechanisms whereby a seller may list or publish information concerning goods or services. A buyer can express interest in or indicate a desire to purchase such goods or services by, for example, responding to a menu presented as a user interface by the online shopping or publication system.

The accurate presentation of online menus that reflect or relate closely to a user's intent is currently a challenge in the field of information retrieval. An example of such a challenge is that menus are usually static and are uniquely defined by sellers. Buyers seeking goods or services might be interested in a different good or service than that offered in a traditional menu provided online for goods or services. As a result, publication systems such as online shopping systems that use a conventional search engine to locate goods and services may not effectively connect the buyers to the sellers and vice versa.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
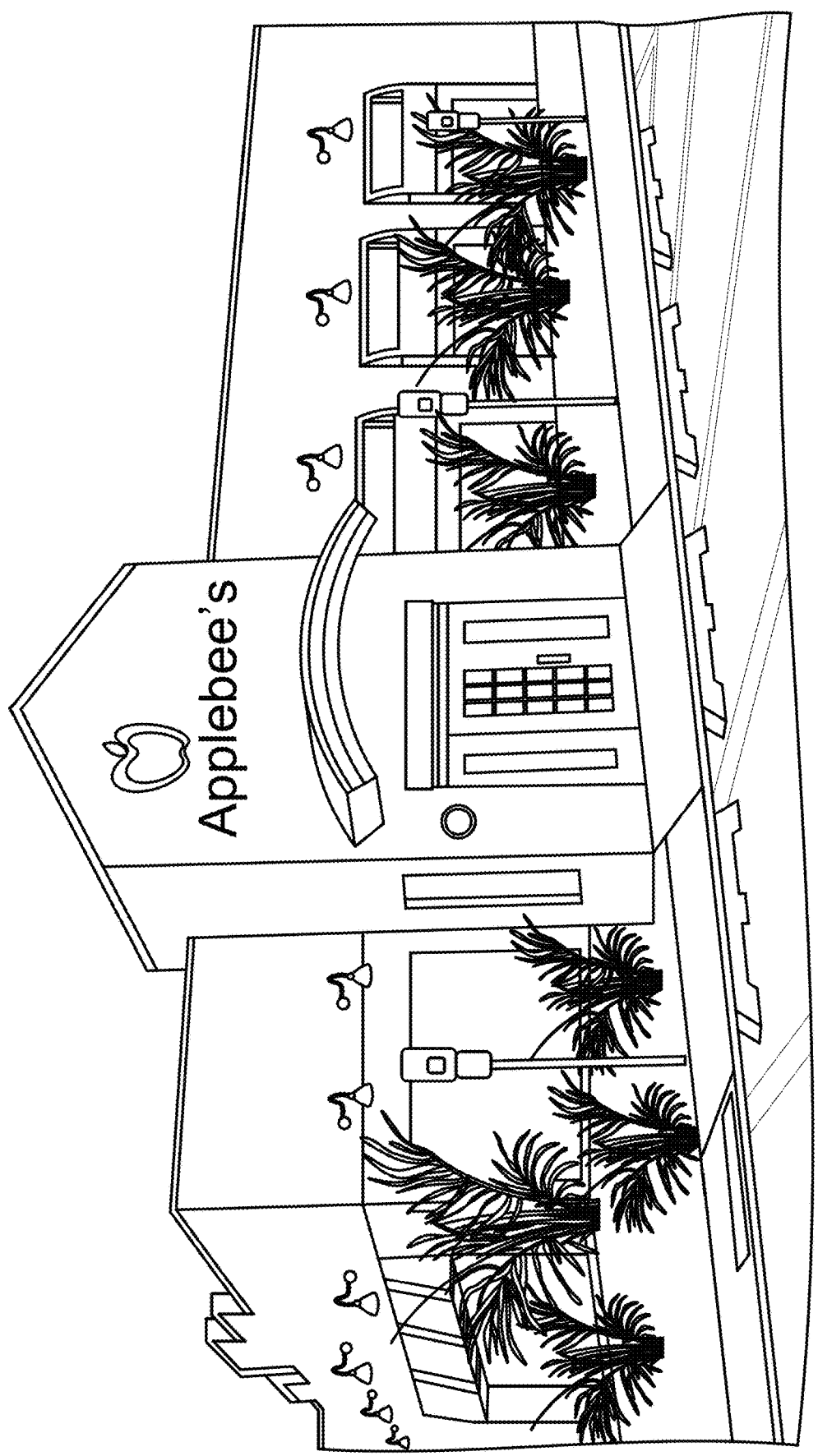
FIG. 1 is a photograph image that may, in accordance with an illustrative embodiment, be submitted for identification and for obtaining a menu related to the image for a good or service desired by a user.

The description that follows includes illustrative systems, methods, techniques, instruction sequences, and computing machine program products that embody illustrative embodiments. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures and techniques have not been shown in detail.

The embodiments described herein provide techniques for providing contextual menus based on images submitted to a network based publication system by way of photographs. The submission may be by way of a network such as, in one embodiment, the Internet, either by wire coupling or wirelessly. Other networks, such as a LAN or other internal or external networks, may be used. As part of identification functionality, images depicting a variety of locales such as businesses, or other items, may be stored in an image repository in, for example, the network-based publication system (e.g., an online shopping system). The stored images in the image repository may be used to identify images that users may submit as photograph images taken by cell phone, camera, webcam, or even by a laptop with camera capability, Alternatively, the publication system may identify the submitted image by performing a location based Internet search based on the submitted image, or based on the location of the camera that supplied the image. Identification of the image may be based on identifying a well known logo or trademark. Image recognition could be based on recognition of an image of the building stored in the system's image repository. The system may then, after categorizing the image, provide the user a menu relating to the photograph, the menu based on context rather than being a generic form of menu. That is, the submitted image, and what the user might want to do with respect to the image at the specific moment when he or she is capturing the image, is a primary consideration for the menu.

A technique for image identification may be seen in U.S. patent application Ser. No. 12/371,882 filed Feb. 16, 2009, entitled "Identification of Items Depicted in Images," and assigned to the assignee of the present application. The application identified in the previous sentence is incorporated herein by reference in its entirety. The foregoing application explains in greater detail a technique by which an item depicted in an image may be identified by matching the image with user submitted images stored in the repository. In some embodiments the match may be based on a comparison of the color histograms of the images.

If, for example, a user takes a photograph image of a restaurant at a given locale, the system would attempt to determine what the user may want to do when taking the picture of the restaurant. Some possibilities might be that the user wants to order something, and the user would like to make a decision based on a contextual menu that is based on that image rather than having a generic menu. Or the user may want to check on the status of a take-out order he has placed with the restaurant. In the latter case, the user may have been given an order number at the time of placing the take out order, and the menu presented by the system could be a user interface that provides the user with the opportunity of entering the order number and the system would then return, for example, the status of the order and when it would be ready for pickup. The system processes the image and identifies it as a restaurant and presents a category driven menu to the user with various selectable options such as, "call the restaurant," or "view the menu from the restaurant."

In another example, if the image is of, say, a local ATT® office, the system may filter and process the image, identify the image as that of an ATT store, categorize the image as an ATT store, and present a category driven menu to the user with various selectable options. In this situation since the image is that of an ATT office, information relating to ATT is available as public information on the internet. The user might be presented with a menu from the web site relating to ATT, with an option for the various services or upgrades offered by ATT. These might include view your bill, pay your bill, see your upgrade options, technical support, new services, and the like. The menu may provide the user with the option of entering or selecting the user's account number in order to see the amount of the current phone bill, to pay the bill, and similar functions and services. For example, options may also including pay your bill by a payment processing system. An example of such a system is PayPal™. Since the foregoing information can be provided as public information, such as that available on the business's website, it is not necessary for the specific entity to be a subscriber to a service on the publication system in order for the function to be performed.

As an example of implementing the foregoing functions, if a user were walking down the street and uses a cell phone camera to take a picture of a sandwich shop, the system may identify the image by the search and comparisons discussed above. Alternatively, the system may determine by GPS or other geographical locating system what buildings are in the local area. The system may then compare the image with stored images of businesses in that local area and identify the image in that manner. When identified as a sandwich shop, if the sandwich shop has its own website, the system may provide a menu based on the website. If the sandwich shop does not have its own website, it may decide to register with the publication system and provide information for the publication system to present with the menu. For, if registered, the business could then provide the publication system with a photograph of one or more of its business location to store in the image repository discussed above, for image identification purposes. The business that registers may also provide menu information both in the initial registration and on a continuing basis for storage in a database for presentation to a user upon receipt of a photograph of the business location taken by or for the user. Again using a restaurant as an example, the registering restaurant may upload its menu, take out options, hours of business, and other details to the publication system. Further, on a continuing basis, say, for example, daily, the restaurant could provide the specials of the day, which could be updated in the database for presentation to the user as indicated in the foregoing sentence.

If the image is that of a popular restaurant like P.F. Chang's that has its own website, the system could link to, as discussed above, the vendor's main website and present a menu or other information to the user based on the website. In addition, businesses such as restaurants, as only one example of many businesses, may wish to register with the publication system even if the business is a well known business with its own website. This would be done for the reasons outlined above for businesses that are not well known.

Further, the user may be provided with the category in which the publication system categorizes the business and may be given the opportunity of changing the category if the user believes changing the category would yield a response from the system that more nearly meets the user's desires at the moment. An example of the statement can be a business called "Club One". In California, this business corresponds to a fitness club/gym. But elsewhere it can be a dance club. Hence the user will be provided with the option to change the original category the image gets sorted into. Further still, the publication system may also provide the business with information indicating the category in which the system placed the business, and provide the business with the opportunity of changing its category if the business believes a different category would be beneficial. The same example may be given for this statement as well. If "Club One" fitness club registers for the service and is categorized as a dance club, the business will also be provided with the choice of changing the category of the business from a dance club to a fitness club.

FIG. 1 is a photograph image that may be submitted for identification and for obtaining a menu related to the image for a good or service desired by a user, sometimes referred to herein as a contextual menu. The photograph may be taken by the user or by some other person. While the photograph is that of a well known restaurant, it may be of any business, for example a local, non-nationally known restaurant, a phone company, or any other business, item or locale.

Figure 2:
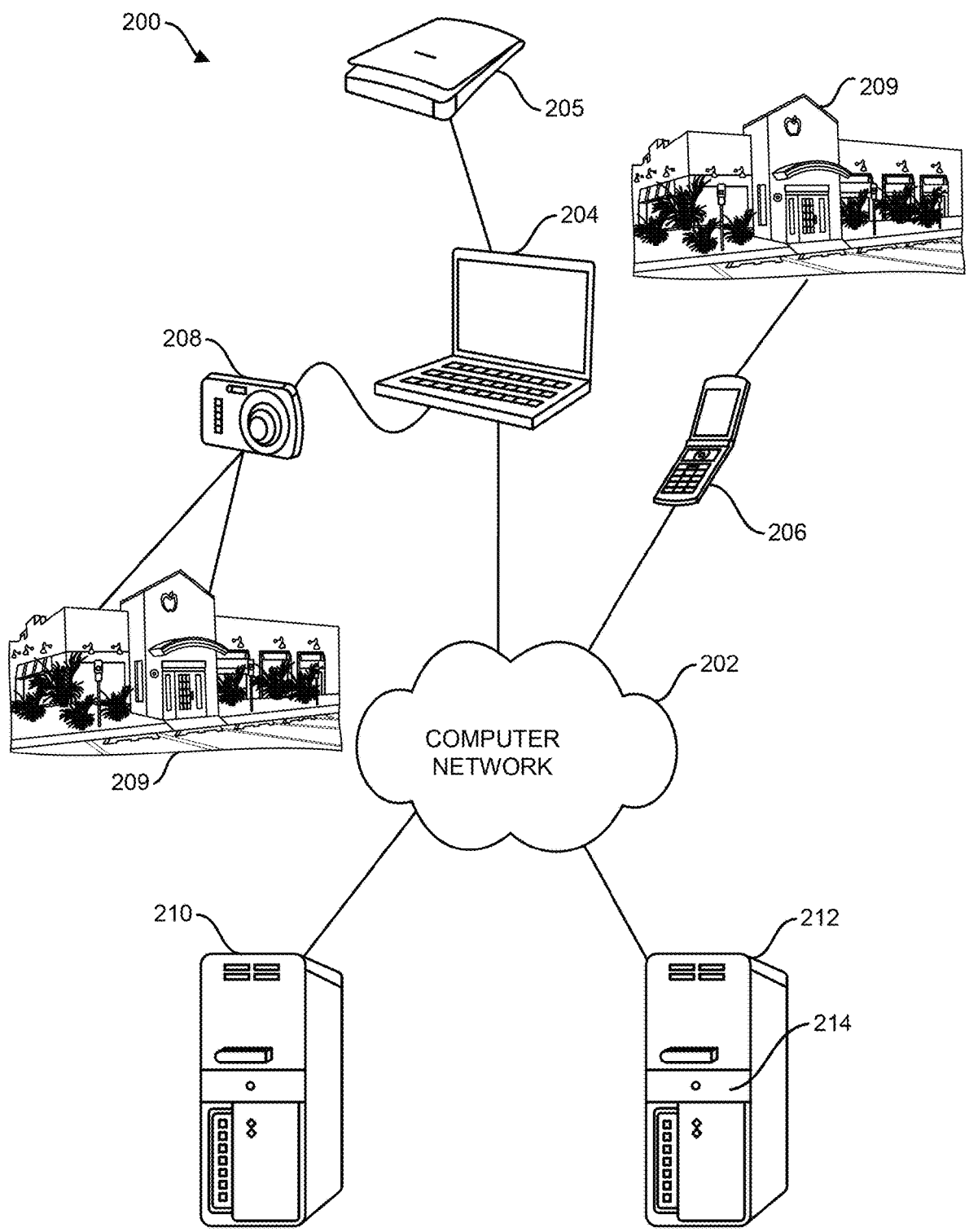
FIG. 2 is a diagram depicting a system, in accordance with an illustrative embodiment, for providing the image of FIG. 1 to a publication system.

FIG. 2 is a diagram depicting a system 200, in accordance with an illustrative embodiment, for identifying items depicted in images. As depicted, the system 200 includes client processing systems (e.g., personal computer 204, mobile phone 206, or similar device) a server 210 hosting a variety of services, and another server 212 hosting an item recognition module 214, which are all interconnected by way of a computer network 202. The computer network 202 is a collection of interconnected processing systems that communicate utilizing wired or wireless mediums. Examples of computer networks, such as the computer network 202, include Local Area Networks (LANs) and/or Wide-Area Networks (WANs), such as the Internet.

In the example of FIG. 2, a client processing system (e.g., personal computer 204 or mobile phone 206) transmits an image of an item 209 to the image recognition module 214, which is hosted on the server 212. The image may be captured by a camera built-in the mobile phone 206 or by a camera 208, which is configurable to download its stored images to the personal computer 204. Further the submitted image could be an already existing photograph or other images capable of being submitted to the publication system by, for example, upload. Alternatively, the user may locate the image through, for example, the Internet or other image repositories and submit it to the system.

The image recognition module 214 accesses the image from the client processing systems and, as explained in more detail below, identifies the item 209 depicted in the image with an item identifier. The item 209 may be, in one embodiment, a business. An "item identifier," as used herein, refers to a variety of values (e.g., alphanumeric characters and symbols) that establish the identity of or uniquely identify one or more items, such as item 209. For example, the item identifier can be a name assigned to the item 209. In another example, the item identifier can be a barcode value (e.g., Universal Product Code (UPC)) assigned to the item 209. In yet another example, the item identifier can be a title or description assigned to the item 209.

In an embodiment, the item recognition module 214, which may include a categorization module to categorize the identified image, may then transmit the item identifier to a service hosted on the server 210 to locate item data. The "item data," as used herein, refer to a variety of data regarding one or more images, in one embodiment a business, depicted in an image, the data posted or associated with the image. Such item data, for example, may be stored with the images or at other locations. Examples of item data may include, in one embodiment, menus related to the business or item. The menus may include locations of the business, prices of the goods or services offered by the business, quantities of the items available at or through the business, availability of the items at the business, and other item data. It should be appreciated that the item recognition module 214 may access a variety of different services by way of, for example, a Web-exposed application program interface (API). In an alternate embodiment, the item recognition module 214 may be embodied with the service itself where, for example, the item recognition module 214 may be hosted in the server 210 with the other services.

The system 200 may also include a global positioning system (not shown) that may be attached to or included in the client processing systems. The client processing systems can transmit the coordinates or location identified by the global positioning system to the services hosted on server 210 and, for example, the services can use the coordinates to locate nearby stores that sell the item 209 depicted in the image.

Figure 3:
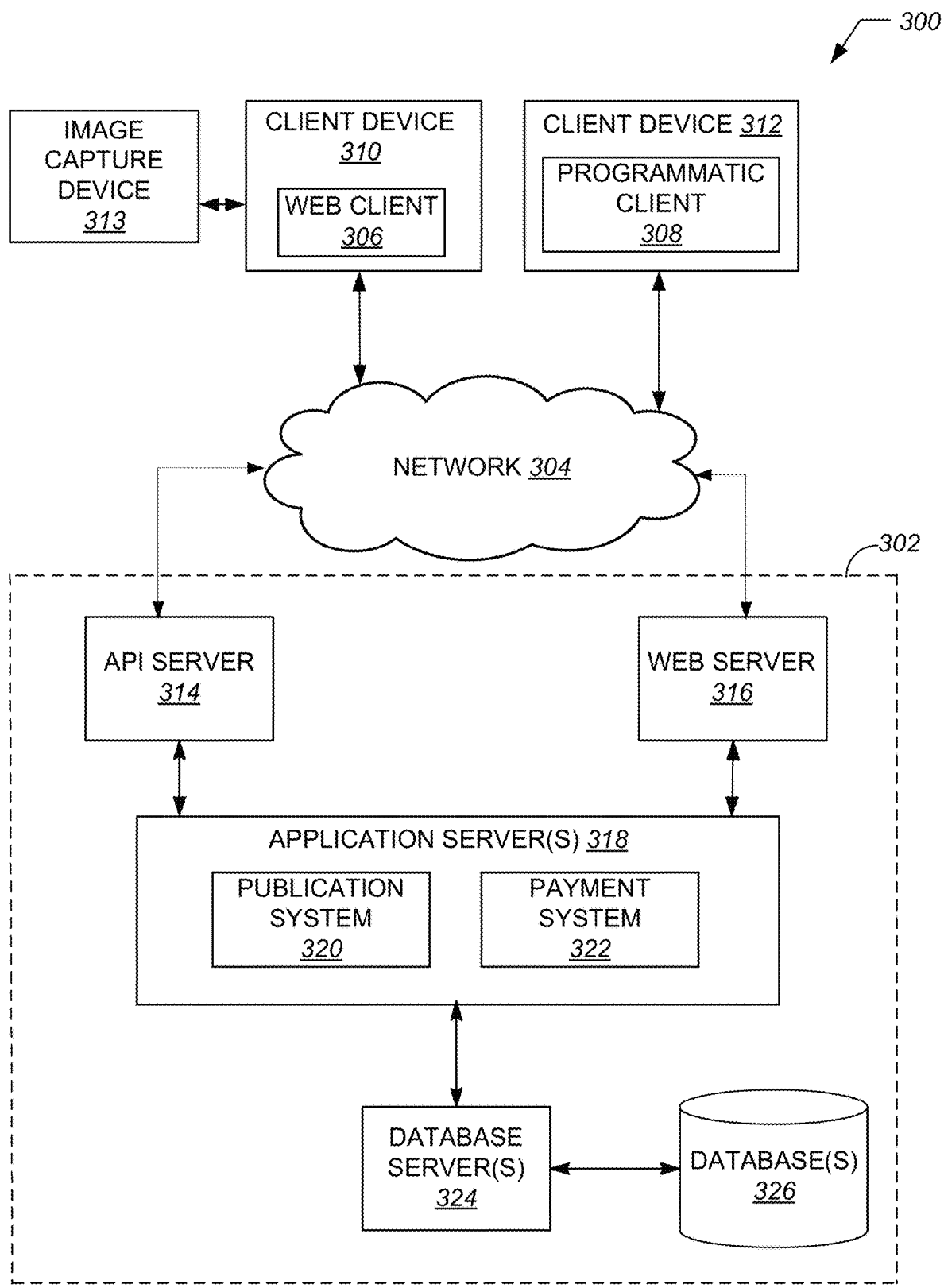
FIG. 3 is a diagram depicting a publication system, in accordance with an illustrative embodiment, that identifies items depicted in images and provides menus relating to the items and that are desired by a user.

With reference to FIG. 3, an example embodiment of a high-level client-server-based network architecture 300, more detailed then FIG. 2, which may include the servers 210 and 212 of FIG. 2. A networked system 302, in an example form of a network-server-side functionality, is coupled via a communication network 304 (e.g., the Internet, wireless network, cellular network, or a Wide Area Network (WAN)) to one or more client devices 310 and 312. FIG. 3 illustrates, for example, a web client 306 operating via a browser (e.g., such as the INTERNET EXPLORER® browser developed by Microsoft® Corporation of Redmond, Wash. State), and a programmatic client 308 executing on respective client devices 310 and 312.

The client devices 310 and 312 may comprise a mobile phone, desktop computer, laptop, or any other communication device that a user may utilize to access the networked system 302. In some embodiments, the client device 310 may comprise or be connectable to an image capture device 313 (e.g., camera, camcorder). In further embodiments, the client device 310 may comprise one or more of a touch screen, accelerometer, microphone, and GPS device. The client devices 310 and 312 may be a device of an individual user interested in visualizing an item within an environment.

An Application Program Interface (API) server 314 and a web server 316 are coupled to, and provide programmatic and web interfaces respectively to, one or more application servers 318. The application servers 318 host a publication system 320 and a payment processor, or payment system, 322, each of which may comprise one or more modules, applications, or engines, and each of which may be embodied as hardware, software, firmware, or any combination thereof. The application servers 318 are, in turn, coupled to one or more database servers 324 facilitating access to one or more information storage repositories or database(s) 326. The databases 326 may also store user account information of the networked system 302 in accordance with example embodiments.

In example embodiments, the publication system 320 publishes content on a network (e.g., Internet). As such, the publication system 320 provides a number of publication functions and services to users that access the networked system 302. The publication system 320 is discussed in more detail in connection with FIG. 4. In example embodiments, the publication system 320 is discussed in terms of a marketplace environment. However, it is noted that the publication system 320 may be associated with a non-marketplace environment such as an informational or social networking environment.

The payment system 322 provides a number of payment services and functions to users. The payment system 322 allows users to accumulate value (e.g., in a commercial currency, such as the U.S. dollar, or a proprietary currency, such as "points") in their accounts, and then later to redeem the accumulated value for products (e.g., goods or services) that are made available via the publication system 320 or elsewhere on the network 304. The payment system 322 also facilitates payments from a payment mechanism (e.g., a bank account, PayPal™, or credit card) for purchases of items via any type and form of a network-based marketplace.

While the publication system 320 and the payment system 322 are shown in FIG. 3 to both form part of the networked system 302, it will be appreciated that, in alternative embodiments, the payment system 322 may form part of a payment service that is separate and distinct from the networked system 302. Additionally, while the example network architecture 300 of FIG. 3 employs a client-server architecture, a skilled artisan will recognize that the present disclosure is not limited to such an architecture. The example network architecture 300 can equally well find application in, for example, a distributed or peer-to-peer architecture system. The publication system 320 and payment system 322 may also be implemented as standalone systems or standalone software programs operating under separate hardware platforms, which do not necessarily have networking capabilities.

Figure 4:
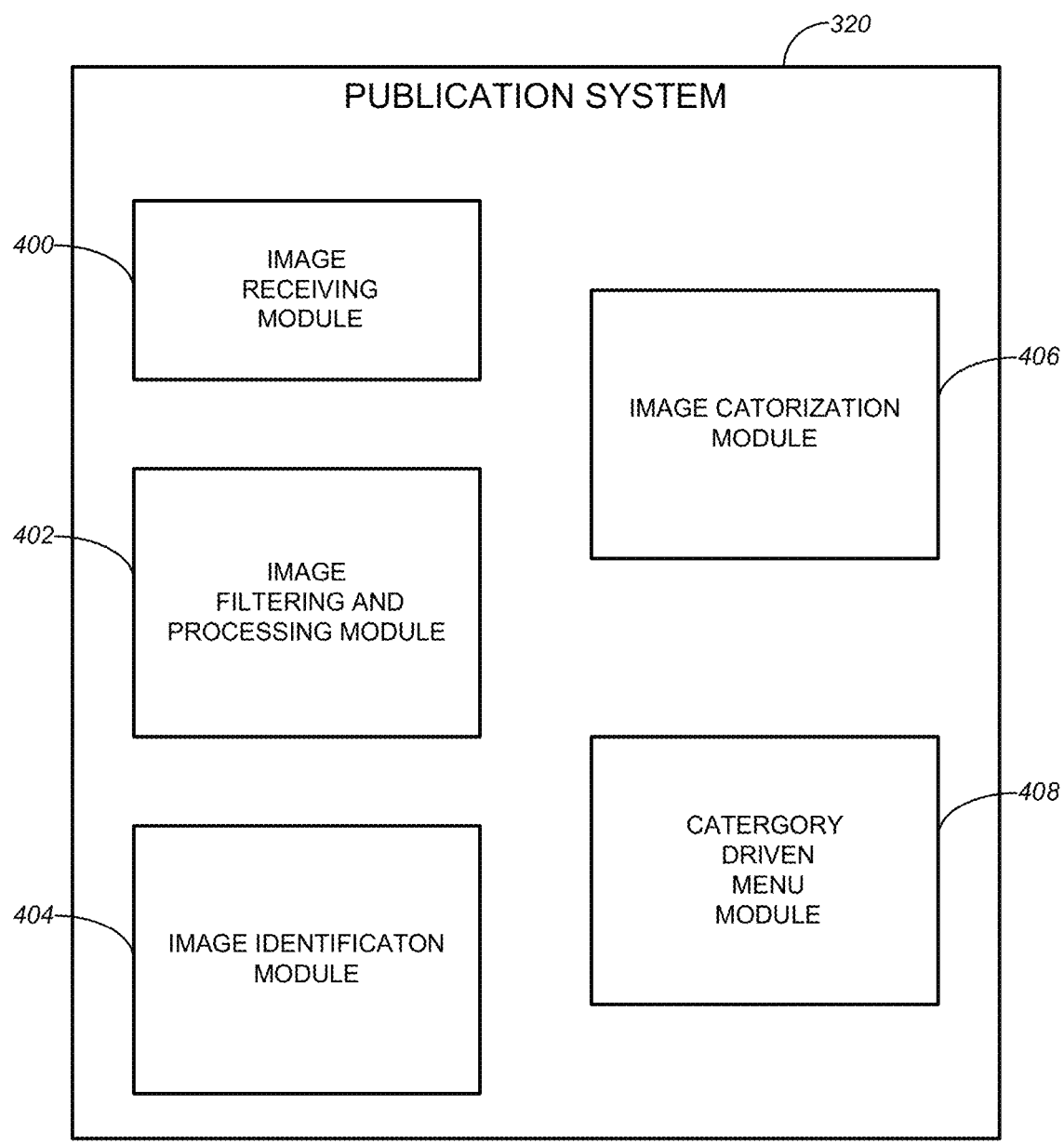
FIG. 4 is a block diagram illustrating an example embodiment of a publication system.

Referring now to FIG. 4, an example block diagram illustrating multiple components that, in one embodiment, are provided within the publication system 320 of the networked system 302 is shown. In one embodiment, the publication system 320 is a marketplace system where items (e.g., goods or services) may be offered for sale. In an alternative embodiment, the publication system 320 is a social networking system or information system. The publication system 320 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 326 via the one or more database servers 324.

In one embodiment, the publication system 320 provides a number of mechanisms whereby the system 320 may publish menus relating to goods or services of a seller or business, a buyer can express interest in or indicate a desire to purchase such goods or services based on an image, and a price can be set for a transaction pertaining to the goods or services. To this end, the publication system 320 may comprise at least one image receiving module 400, one or more image filtering and processing module 402, one or more image identification module 404, one or more image categorization module 406, and one or more menu generation module 408.

An image receiver module 400 is an image receiver that receives images that are uploaded to the publication system by a user that are identified and categorized by the publication system and then used in retrieving menus that, based on the categorization, relate to the image and are desired by the user.

An image filtering and processing module 402 provides well known functionality for filtering and processing image information in order to remove image defects such as, in one embodiment, defects that lead to undesired red-eye or other flash characteristics. This may allow more effective identification of the image.

An image identification module 404 allows identification of the image submitted by the user. As explained in more detail in the above-incorporated application, an item depicted in an image may be identified by matching the image known images stored in an image repository. In some embodiments, also as explained in the foregoing application, the match may be based on a comparison of the color histograms of the images.

An image categorization module 406 allows categorization of images identified by image identification module 404. An example of such image categorization is disclosed in U.S. patent application Ser. No. 11/952,026 entitled "Image Categorization Based on Comparisons between Images" filed on Dec. 6, 2007 and assigned to the assignee of the present application. The foregoing application is hereby incorporated herein by reference in its entirety.

A category driven menu module 408 allows generation of category specific menus. For example, if the image is of a restaurant, the menu generation module could generate, as one example, a link to the restaurant's main website, providing menus, directions to the business, hours of operation, specials of the day, take-out information, and the like. This will be discussed in further detail below. For example, the category driven menu module 408 may also deliver menus by electronic mail (e-mail), instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

Although the various components of the publication system 320 have been defined in terms of a variety of individual modules and engines, a skilled artisan will recognize that many of the items can be combined or organized in other ways. Alternatively, not all components of the publication system 320 of FIG. 4 may be utilized. Furthermore, not all components of the publication system 320 have been included in FIG. 4. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 4A:
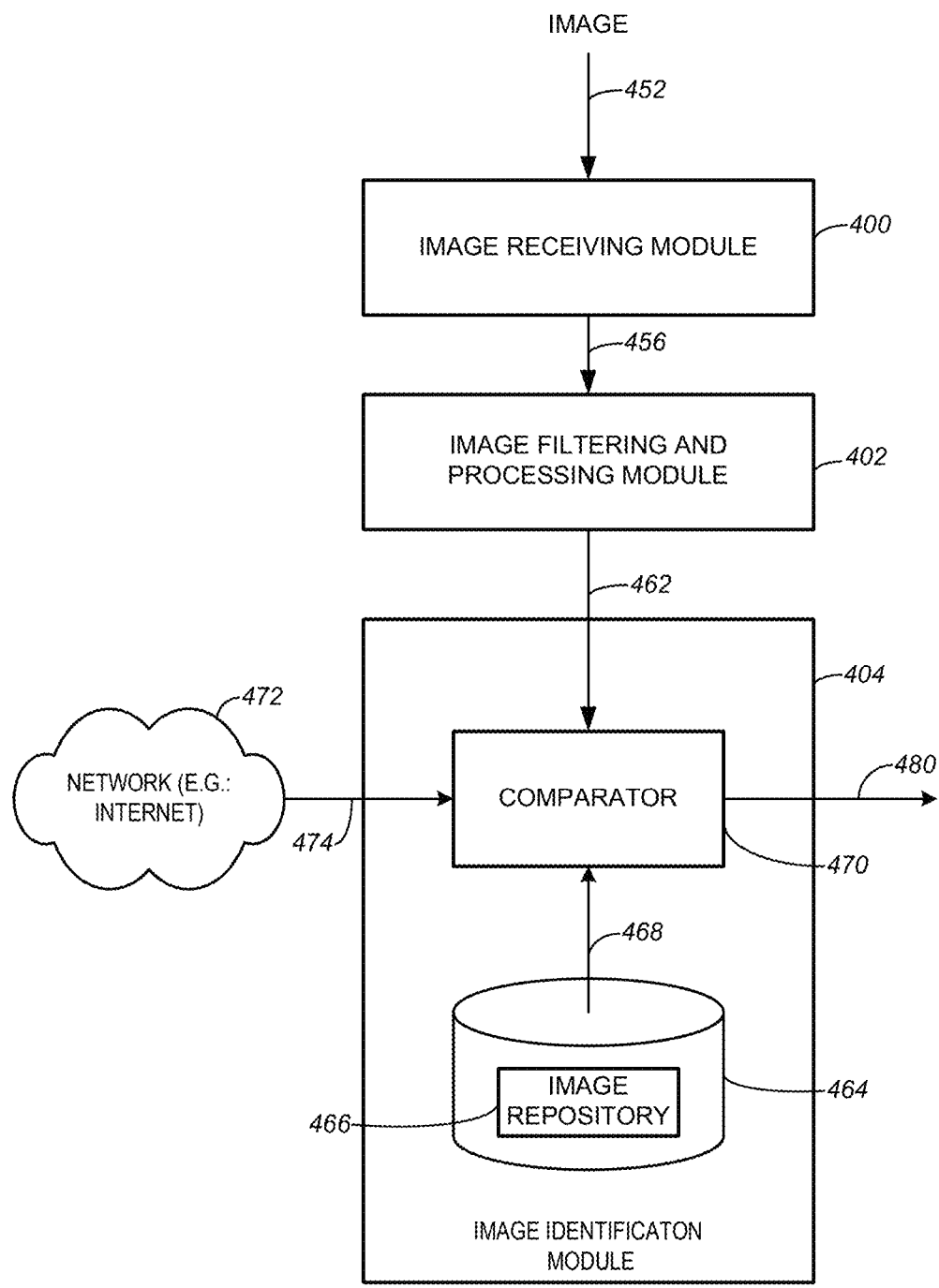
FIG. 4A is an illustration of various modules of an implementation of an image identification module useful in an example embodiment.

FIG. 4A is an illustration of various modules of an implementation of an image identification module useful in an example embodiment image identification module 406 comprises database 464 which includes image repository 466. Database 464 may be included as part of database 326 of FIG. 3. Image repository 466 may be used for storing images that are to be compared to an image which may be received from a user over line 452 at image receiving module 400. The image may be filtered and processed at image filtering and processing module 402 to remove or minimize defects. The filtered image enters image identification module 404 over line 462. The image over line 462 and comparison images from repository 466 are compared in comparator 470. If there is a successful identification, the image identification information is provided over line 480. Alternatively, the image over line 462 may be compared in comparator 470 with images obtained from network 472 over line 474, identification information again being provided over line 480.

Figure 5:
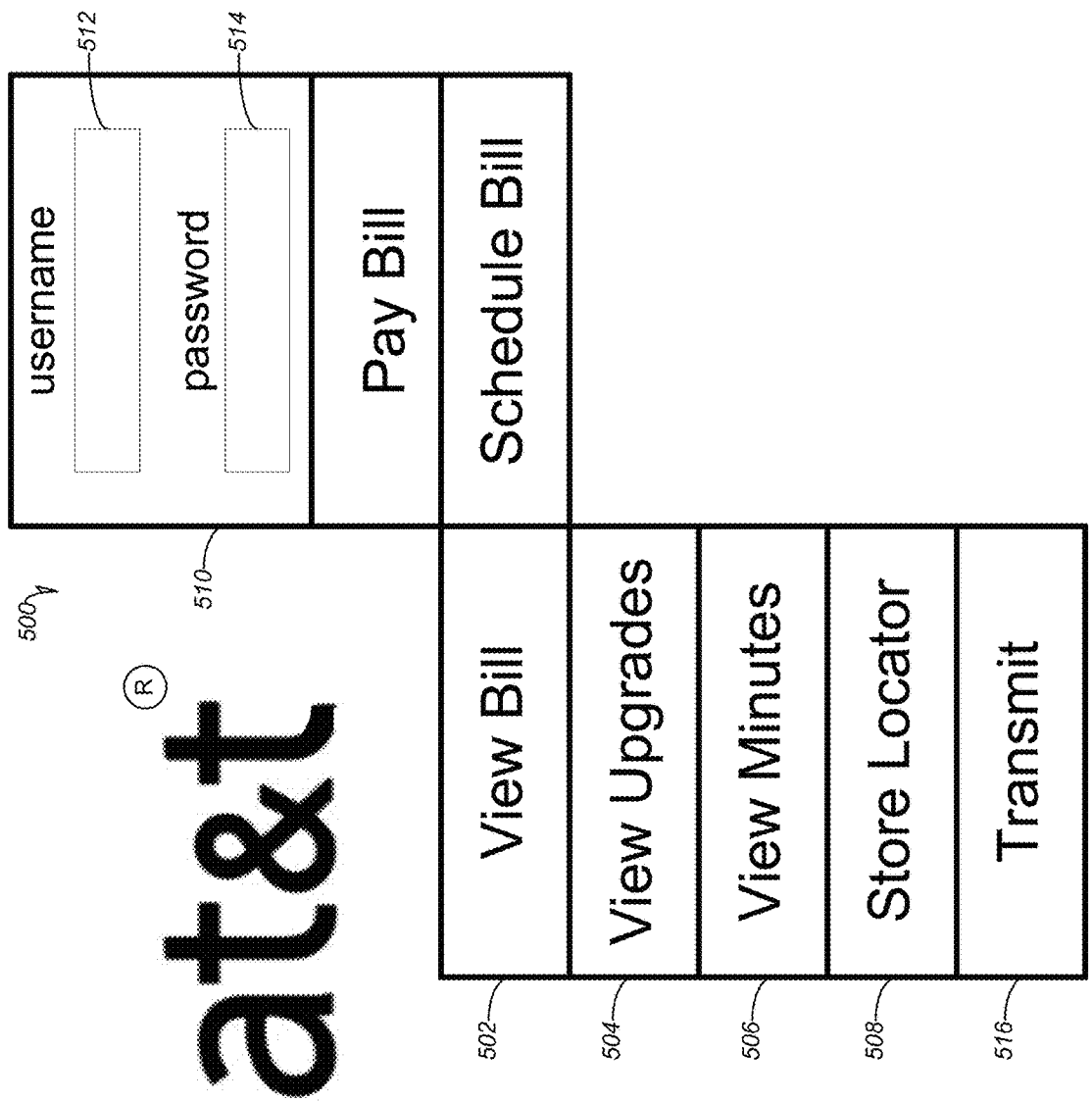
FIG. 5 is an illustration of a contextual menu in accordance with an illustrative embodiment.

FIG. 5 is an illustration of a contextual menu 500 in accordance with an exemplary embodiment. Consider for example, if the image of the menu relates to, say, a local ATT office, the system may filter and process the image, identify the image as that of an ATT store, categorize the image as an ATT store, and present a category driven menu to the user with icons selectable by the user and space for entering information by the user. The possible options may be selectable icons to "View Bill" 502, or "View Upgrades" 504, or "View Minutes" 506, "Store Locator" 508, among others. User space 510 may, in the embodiment under discussion, include space 512 for user name and space 514 for user password. For example, if the user selects View Bill 502, he or she may be prompted also to include name and password for the appropriate account for transmission to the ATT organization via a transmit radio button such as 516.

Figure 6:
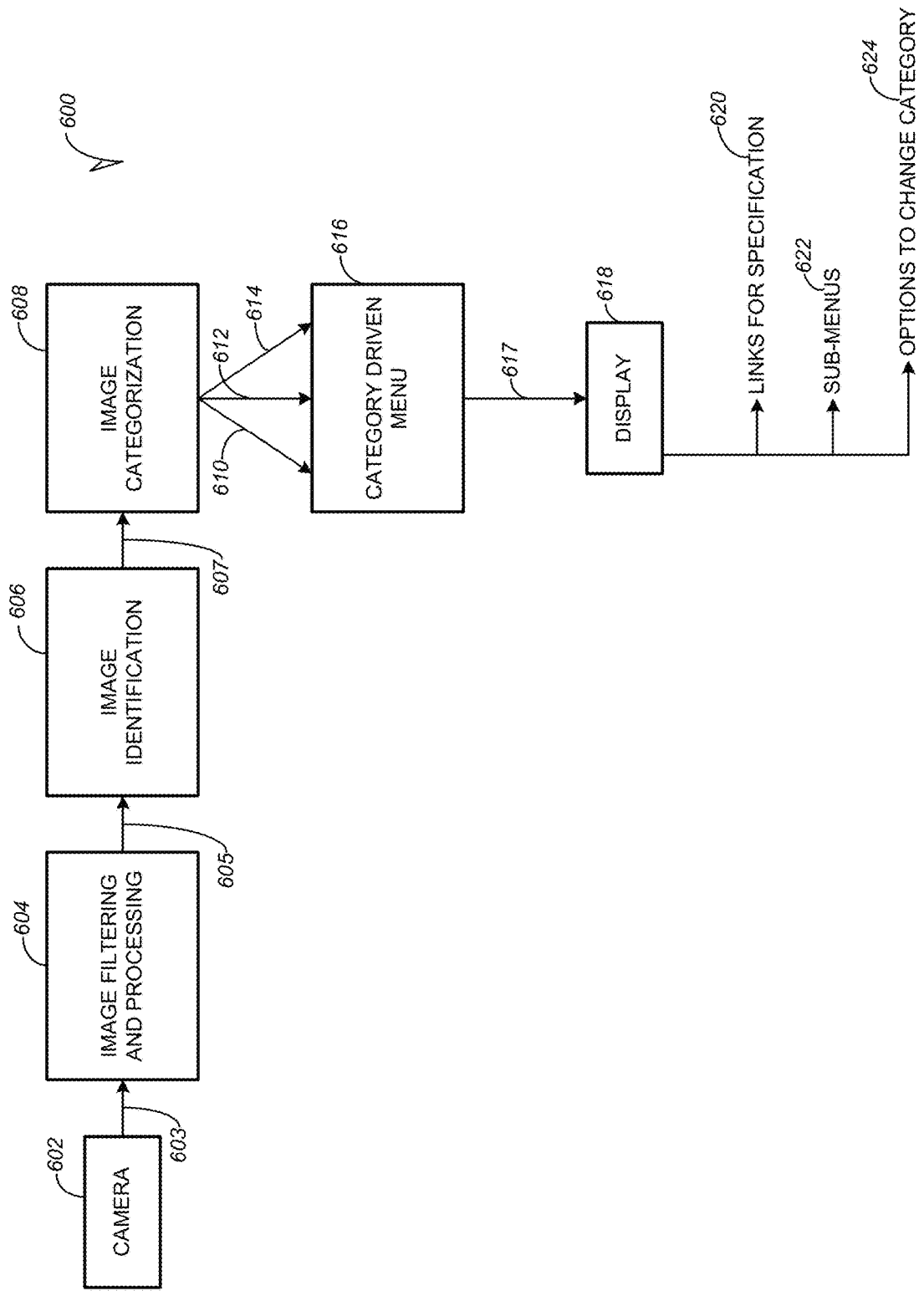
FIG. 6 is a flow chart illustrating a method useful in an example embodiment for providing to users contextual menus relating to the images provided to the system seen in FIGS. 2 and 3.

FIG. 6 is a flow chart illustrating a method useful in an example embodiment for providing to users contextual menus relating to the images provided to the system seen in FIGS. 2 and 3. Camera 602 may be in a cell phone, personal digital assistant, or laptop, or it may be another camera, or a webcam. An image such as from a photograph is transmitted from the camera 602 for image filtering and processing at image filtering and processing module 402 of FIG. 4. This image may be transmitted as described above with respect to FIG. 2, FIG. 3, and FIG. 4A. Image filtering and processing module 402 includes filtering software to process the image to remove issues that militate against identification of the image. For example issues such as redeye and other anomalies caused by flash are removed by well known means. The filtered image is transmitted over line 605 for image identification at image identification module 404 of FIG. 4A, which identifies the image transmitted by camera 602. For example, if the image is letters, if may be identified by comparison to stored letters, including trademarks and logos. If the image is a building, it may be identified by comparison with stored images of buildings. Comparison may be by comparator 470 of FIG. 4A, the comparison being to images stored in repository 466 of database 464 for identification, or to images from Internet 472 of FIG. 4A. The identified image, or information that represents the identified image, is transmitted over line 607 for categorization at image categorization module 406 of FIG. 4. Image categorization module 406 categorizes the identified image into a particular category based on the identity such as, for example, ATT office 610, McDonalds® 612, bakery shop 614, and the like. Based on the categorization, the image categorization module sends an appropriate identifier, by way of one of lines 610, 612, . . . , 614, to category driven menu module 616 which will provide the appropriate menu for rendering for the user at display 618. In the described embodiment, the category of the image determines what the menu options might be for the particular image. If the business is widely known, such as ATT, the, the business's website might be provided by category driven menu module 616. If the identified business is not widely known, and the business subscribes with the publication system for the service described herein, the category driven menu module 616 provides the menu determined by the subscribing business.

Figure 7:
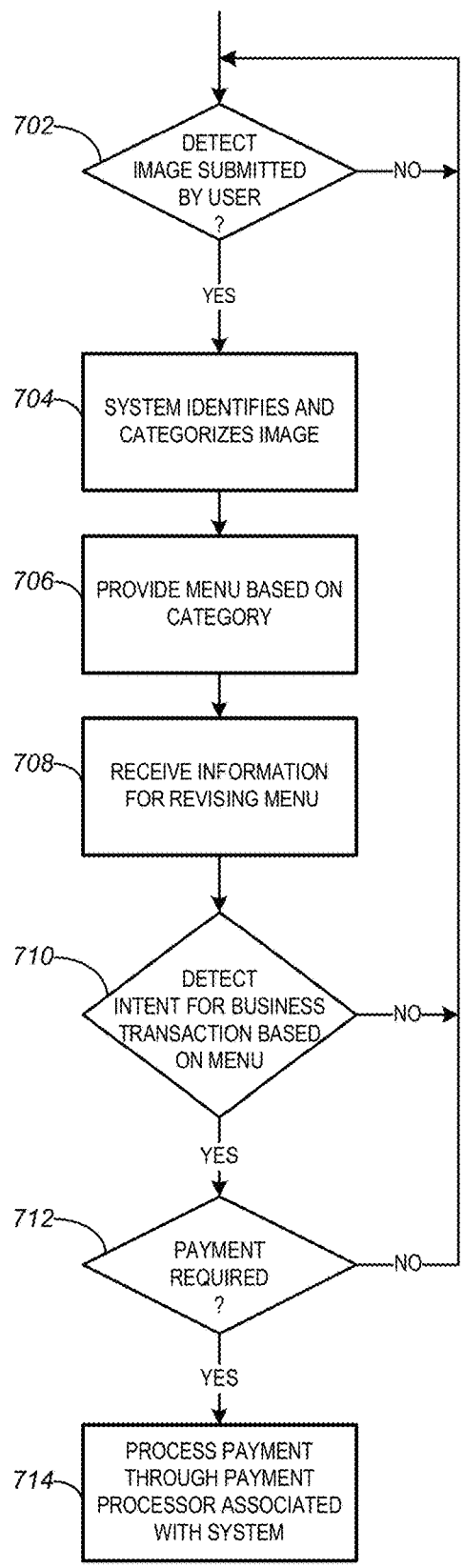
FIG. 7 is a flow chart further illustrating the method of FIG. 6.

The links in the menu will be provided in the user interface. Links for specifications 620 may be, in one example, for the example in which the business is a restaurant, a link to the restaurant's website that displays a menu or other business information. As another example, if the image is of, say, a local ATT office, the system may filter and process the image, identify the image as that of an ATT store, categorize the image as an ATT store, and present a category driven menu to the user with various selectable options. The possible options may be to "View the bill" or "View Minutes" or "Store Locator" etc. A possible submenu for "View Bill" might be "Pay Bill" or "Schedule a payment" Submenus 622 may be, if the restaurant is a subscriber and, for example, has menus describing daily specials, the daily special could be a submenu that could be linked to. Option to change category 624 provides the user an option to change the category in case the user believes that the category determined by image categorization module 608 may not be appropriate for the image. For example, if the user takes a picture of, say, a coffee shop like Starbuck's, and the image is identified and categorized as a restaurant instead of a coffee shop, a menu the system determines is appropriate is forwarded by category driven menu module 616, which may be accompanied by option to change category 624, which may be selectable, that gives the user the option of changing the category from restaurant to coffee shop. FIG. 7 is a flow chart further illustrating a method according to another embodiment. In operation 702, the system searches to detect, by image receiving module 400, an image submitted by the user. If the image is detected, at the Yes leg, the system at 704 identifies and categorizes the image, by use of image identification module 404 and image categorization module 406. If the No leg is taken, operation 702 continues. After image identification and categorization, operation 706 provides a menu, sometimes called a specification, based on the category. In operation 708 the system may receive information from the user for modifying the menu to make the menu relate more closely to the intent of the user who submitted the image. Consider the example of "ClubOne", which can either be a health club or a dance club, since both share the same name. If the user submitted the image of ClubOne, the dance club, but the system categorizes that image as a health club, the user can change the category of the image to dance club. By doing so, he/she can receive relevant menu options for a dance club such as "View events", or "View DJ" or "Buy tickets". Operation 710 tests to detect whether the intent of the user is to conclude a business transaction based on the menu. If Yes then, optionally, operation 712 determines whether payment is required. If yes, the system processes payment through a payment processor associated with the system, such as payment system 322. In the case of a No decision at steps 710 and 712, the system returns to the detection operation at 702.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
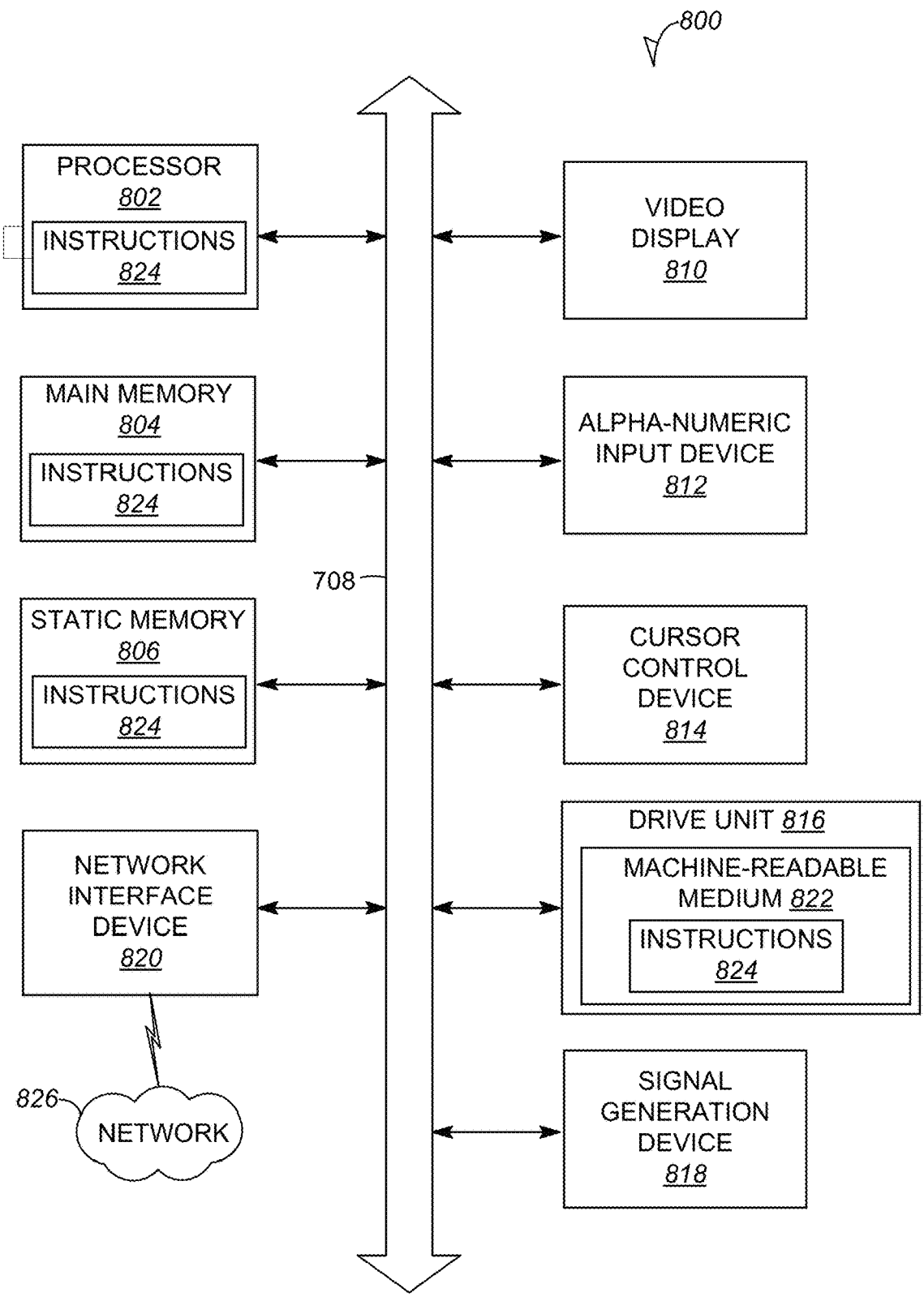
FIG. 8 is a block diagram depicting a machine in the example form of a processing system within which a set of instructions, for causing the machine to perform any one or more of the methodologies discussed herein, may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Storage Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, with the main memory 804 and the processor 802 also constituting machine-readable media.

While the machine-readable storage medium 822 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, from a client device, an image depicting a physical item;
   providing, to the client device, an initial menu associated with a first establishment, the initial menu including one or more options for the first establishment, and determined based on an initial categorization of a content of the image depicting the physical item;
   in response to providing the initial menu, receiving, from the client device, an indication to modify the initial menu including the one or more options, the indication providing additional category information for the image depicting the physical item; and providing, by at least one processor, a second menu for a second establishment to replace the initial menu at the client device and one or more second options for the second establishment to replace the one or more options for the first establishment, the one or more second options for the second establishment determined based on the additional category information provided by the client device.

2. The method of claim 1, wherein the providing the initial menu further comprises determining the one or more options for the initial menu based on location information associated with the image depicting the physical item.

3. The method of claim 2, wherein the providing the initial menu further comprises determining the one or more options for the initial menu based on an image detection of the image depicting the physical item.

4. The method of claim 3, wherein the providing the initial menu further comprises determining the one or more options for the initial menu based on the location information associated with the image depicting the physical item and an image detection characters depicting in the image of the physical item.

5. The method of claim 4, wherein the initial categorization comprises an identity of the physical item, wherein the initial menu including the one or more options are selected based on the initial categorization including the identity and the location information of the physical item.

6. The method of claim 1, wherein the initial menu includes a first graphical user interface menu for a first network site corresponding to the initial categorization.

7. The method of claim 6, wherein the second menu includes a second graphical user interface menu for a second network site determined based on the additional category information provided by the client device.

8. The method of claim 7, further comprising:
transmitting at least a first data item to the second network site; and
receiving at least a second data item from the second network site, wherein the first network site is a different site from the second network site.

9. The method of claim 7, further comprising:
receiving, from the first network site, a first set of content to include in the first graphical user interface menu; and
receiving, from the second network site, a second set of content to include in the second graphical user interface menu.

10. The method of claim 1, wherein the indication to modify the initial menu indicates to change the initial categorization from a first category to second category.

11. A system comprising:
at least one processor; and
at least one memory including program code which when executed by the at least one processor causes the system to provide operations comprising:
receiving, from a client device, an image depicting a physical item;
providing, to the client device, an initial menu associated with a first establishment, the initial menu including one or more options for the first establishment, and determined based on an initial categorization of a content of the image depicting the physical item;
in response to providing the initial menu, receiving, from the client device, an indication to modify the initial menu including the one or more options, the indication providing additional category information for the image depicting the physical item; and providing a second menu for a second establishment to replace the initial menu at the client device and one or more second options for the second establishment to replace the one or more options for the first establishment, the one or more second options for the second establishment determined based on the additional category information provided by the client device.

12. The system of claim 11, wherein the providing the initial menu further comprises determining the one or more options for the initial menu based on location information associated with the image depicting the physical item.

13. The system of claim 12, wherein the providing the initial menu further comprises determining the one or more options for the initial menu based on an image detection of the image depicting the physical item.

14. The system of claim 13, wherein the providing the initial menu further comprises determining the one or more options for the initial menu based on the location information associated with the image depicting the physical item and an image detection characters depicting in the image of the physical item.

15. The system of claim 14, wherein the initial categorization comprises an identity of the physical item, wherein the initial menu including the one or more options are selected based on the initial categorization including the identity and the location information of the physical item.

16. The system of claim 15, wherein the initial menu includes a first graphical user interface menu for a first network site corresponding to the initial categorization.

17. The system of claim 16, wherein the second menu includes a second graphical user interface menu for a second network site determined based on the additional category information provided by the client device.

18. The system of claim 17, the operations further comprising:
transmitting at least a first data item to the second network site; and
receiving at least a second data item from the second network site, wherein the first network site is a different site from the second network site.

19. The system of claim 17, the operations further comprising:
receiving, from the first network site, a first set of content to include in the first graphical user interface menu.

20. The system of claim 17, the operations further comprising:
receiving, from the second network site, a second set of content to include in the second graphical user interface menu.

21. A non-transitory computer-readable storage medium including program code which when executed by at least one processor causes a system to perform operations comprising:
receiving, from a client device, an image depicting a physical item;
providing, to the client device, an initial menu associated with a first establishment, the initial menu including one or more options for the first establishment, and determined based on an initial categorization of a content of the image depicting the physical item;
in response to providing the initial menu, receiving, from the client device, an indication to modify the initial menu including the one or more options, the indication providing additional category information for the image depicting the physical item; and providing a second menu for a second establishment to replace the initial menu at the client device and one or more second options for the second establishment to replace the one or more options for the first establishment, the one or more second options for the second establishment determined based on the additional category information provided by the client device.

* * * * *